US011005625B2

(12) United States Patent
Ren et al.

(10) Patent No.: US 11,005,625 B2
(45) Date of Patent: May 11, 2021

(54) REFERENCE SIGNAL INDICATION METHOD AND APPARATUS TO IMPROVE SPECTRUM EFFICIENCY

(71) Applicant: Huawei Technologies Co., Ltd., Shenzhen (CN)

(72) Inventors: Xiang Ren, Shanghai (CN); Yong Liu, Shanghai (CN); Lu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/526,636

(22) Filed: Jul. 30, 2019

(65) Prior Publication Data
US 2019/0356442 A1 Nov. 21, 2019

Related U.S. Application Data

(63) Continuation of application No. PCT/CN2018/071602, filed on Jan. 5, 2018.

(30) Foreign Application Priority Data

Feb. 4, 2017 (CN) .......................... 201710064273.6

(51) Int. Cl.
*H04W 4/00* (2018.01)
*H04L 5/00* (2006.01)
*H04W 72/04* (2009.01)

(52) U.S. Cl.
CPC .......... *H04L 5/0048* (2013.01); *H04L 5/0007* (2013.01); *H04L 5/0021* (2013.01);
(Continued)

(58) Field of Classification Search
CPC ..... H04L 5/0048; H04L 5/007; H04L 5/0021; H04L 5/0039; H04W 72/0446; H04W 72/0453; H04W 52/34; H04W 52/14
See application file for complete search history.

(56) References Cited

U.S. PATENT DOCUMENTS 10,447,447 B2 * 10/2019 Namgoong ........... H04L 5/0051
2012/0300728 A1 * 11/2012 Lee ....................... H04L 5/0023
370/329
(Continued)

FOREIGN PATENT DOCUMENTS

CN 101873204 A 10/2010
CN 101964706 A 2/2011
(Continued)

OTHER PUBLICATIONS

"Evaluation results of DMRS design for DL data channel," 3GPP TSG RAN WG1 NR Ad Hoc Meeting, Spokane, USA, R1-1700068, pp. 1-11, 3rd Generation Partnership Project, Valbonne, France (Jan. 16-20, 2017).
(Continued)

*Primary Examiner* — Abdelnabi O Musa
(74) *Attorney, Agent, or Firm* — Leydig, Voit & Mayer, Ltd.

(57) ABSTRACT

This application discloses an indication method and apparatus, to support a requirement of a complex and fickle scenario. The method includes: generating and sending an arrangement indication used to indicate an arrangement manner of a reference signal, where the reference signal occupies at least one group of time frequency resources, and the arrangement manner is frequency division, time division, frequency division+code division, or time division+code division; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain.

24 Claims, 9 Drawing Sheets

(52) U.S. Cl.
CPC ....... *H04L 5/0039* (2013.01); *H04W 72/0446* (2013.01); *H04W 72/0453* (2013.01)

(56) References Cited

U.S. PATENT DOCUMENTS

| | | | |
|---|---|---|---|
| 2013/0223332 A1* | 8/2013 | Wu | H04L 5/0032 |
| | | | 370/315 |
| 2014/0295909 A1* | 10/2014 | Ouchi | H04W 52/40 |
| | | | 455/522 |
| 2018/0026684 A1* | 1/2018 | Wei | H04W 72/1289 |
| | | | 370/329 |
| 2020/0044809 A1* | 2/2020 | Zhang | H04L 5/0048 |

FOREIGN PATENT DOCUMENTS

| | | |
|---|---|---|
| CN | 102843324 A | 12/2012 |
| EP | 2827668 A1 | 1/2015 |
| WO | 2010148402 A2 | 12/2010 |
| WO | 2016127309 A1 | 8/2016 |
| WO | 2018082244 A1 | 5/2018 |

OTHER PUBLICATIONS

"DMRS designs for NR MIMO," 3GPP TSG-RAN WG1 NR AH, Spokane, WA, USA, R1-1700874, pp. 1-12, 3rd Generation Partnership Project, Valbonne, France (Jan. 16-20, 2017).

* cited by examiner

REFERENCE SIGNAL INDICATION METHOD AND APPARATUS TO IMPROVE SPECTRUM EFFICIENCY

CROSS-REFERENCE TO RELATED APPLICATIONS

This application is a continuation of International Application No. PCT/CN2018/071602, filed on Jan. 5, 2018, which claims priority to Chinese Patent Application No. 201710064273.6, filed on Feb. 4, 2017. The disclosures of the aforementioned applications are hereby incorporated by reference in their entireties.

TECHNICAL FIELD

This application relates to the field of communications technologies, and in particular, to an indication method and apparatus.

BACKGROUND

In a current communications system, radio channel information is obtained and compensated mainly based on a pilot signal or a reference signal (RS). In an orthogonal frequency division multiplexing (OFDM) system, an RS is distributed on different resource elements (RE) in two-dimensional time-frequency space in an OFDM symbol, and has a known amplitude and a known phase. In a multiple-input multiple-output (MIMO) system, each transmit antenna (a virtual antenna or a physical antenna) has an independent data channel. Based on an RS signal known in advance, a receiver performs channel estimation for each transmit antenna, and recovers sent data based on this.

Channel estimation is mainly used to compensate for channel fading and noise to re-establish a signal receiving process, and time domain and frequency domain changes of a channel are tracked by using an RS known by a transmitter and a receiver in advance. For example, to implement channel quality measurement and data demodulation of a higher-order multiple-antenna system, in a long term evolution-advanced (LTE-A) system, a plurality of RSs are defined, including: a cell-specific reference signal (CRS), a demodulation reference signal (DMRS), and a channel state information-reference signal (CSI-RS), where the DMRS is used to demodulate a physical downlink shared channel (PDSCH). A CSI-RS is used to perform channel measurement corresponding to an antenna port. A reference signal is introduced into R10 to measure channel state information in a transmission mode (TM) 9/10, and further to generate transmission configuration information related to scheduling, link adaptation, and MIMO transmission, and the like. Specifically, a system reports information such as a channel quality indicator (CQI), a precoding matrix indicator (PMI), and a rank indication (RI) based on a CSI-RS measurement result. A CRS is used to measure downlink channel quality to schedule a resource and support a link adaptation technology, and therefore is sent in all available frequency bands and all subframes.

In a current standard, an RS is usually generated based on a fixed sequence, and is mapped in a physical resource block (PRB) in a fixed density and a fixed manner based on a port quantity. Generally, an RS has a single function, and different RSs perform only functions corresponding to the RSs. In each current pilot pattern, mapping rules and functions of RS ports are all the same, and cannot be configured based on different scenarios. For example, a pilot pattern of a CSI-RS depends on CSI-RS configuration information, each configuration provides time-frequency resource mapping locations in a subframe for RSs corresponding to different port quantities, and RSs corresponding to 31 configurations may occupy a total of 40 REs in a normal subframe.

As communications technologies rapidly develop, a high speed, a high capacity, and a wide coverage already become main requirements of a future communications system, and it is critical to resolve undesirable property problems such as serious fading and interference caused by a constantly increasing communication range and a complex and diversified communication environment. As 5G new radio (5G NR) puts forward multi-scenario, multiband, and multi-transmission-mode requirements, how to enable an RS requirement of a system to be flexibly configured based on different scenarios or requirements, and ensure high-quality data transmission and high resource efficiency already becomes a problem that urgently needs to be resolved in a 5G NR system.

SUMMARY

This application provides an indication method and apparatus, to resolve a problem of a fixed mapping manner and a single function of a current RS mapping and configuration solution, and implement more reliable data transmission.

According to a first aspect, this application provides an indication method. The method includes:

generating an arrangement indication, where the arrangement indication is used to indicate an arrangement manner of a reference signal, the reference signal occupies at least one group of time frequency resources, and the arrangement manner is a frequency division manner, a time division manner, a frequency division+code division manner, or a time division+code division manner; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain; in the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and in the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal; and sending the arrangement indication.

In the foregoing manner, the base station can flexibly configure the arrangement manner of the reference signal in different scenarios based on transmission requirements of the different scenarios and the foregoing selectable arrangement manners, and dynamically and flexibly configure the arrangement manner of the RS, thereby implementing more reliable data transmission.

In a possible implementation, in the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, in the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, in the frequency division manner or the frequency division+code division manner, different groups of time frequency resources occupy a same quantity of subcarriers in frequency domain.

In a possible implementation, in the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

In the foregoing manner, the arrangement manner of the reference signal can be dynamically switched in a same RS pattern, thereby reducing system complexity.

According to a second aspect, this application provides an indication method. The method includes:

receiving an arrangement indication, where the arrangement indication is used to indicate an arrangement manner of a reference signal; and determining the arrangement manner of the reference signal based on the arrangement indication, where the reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

In a possible implementation, if the arrangement manner of the reference signal is the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, if the arrangement manner of the reference signal is the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, if the arrangement manner of the reference signal is the frequency division manner or the frequency division+code division manner, different groups of time frequency resources occupy a same quantity of subcarriers in frequency domain.

In a possible implementation, if the arrangement manner of the reference signal is the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

According to a third aspect, this application provides an indication apparatus. The apparatus is deployed in a base station, and the apparatus includes:

a generation module, configured to generate an arrangement indication, where the arrangement indication is used to indicate an arrangement manner of a reference signal, the reference signal occupies at least one group of time frequency resources, and the arrangement manner is a frequency division manner, a time division manner, a frequency division+code division manner, or a time division+code division manner; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain; in the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and in the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal; and a sending module, configured to send the arrangement indication.

In a possible implementation, in the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, in the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, in the frequency division manner or the frequency division+code division manner, different groups of time frequency resources occupy a same quantity of subcarriers in frequency domain.

In a possible implementation, in the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

For implementation and beneficial effects of the apparatus according to any one of the third aspect of the present invention or the implementations of the third aspect and implementation and beneficial effects of the method according to any one of the first aspect of the present invention or the implementations of the first aspect, refer to each other, and repeated parts are not described in detail again.

According to a fourth aspect, this application provides an indication apparatus. The apparatus is deployed in a terminal, and the apparatus includes:

a receiving module, configured to receive an arrangement indication, where the arrangement indication is used to indicate an arrangement manner of a reference signal; and a determining module, configured to determine the arrangement manner of the reference signal based on the arrangement indication, where the reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

In a possible implementation, when the arrangement manner of the reference signal is the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, when the arrangement manner of the reference signal is the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, when the arrangement manner of the reference signal is the frequency division manner or the frequency division+code division manner, different groups of time frequency resources occupy a same quantity of subcarriers in frequency domain.

In a possible implementation, when the arrangement manner of the reference signal is the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

For implementation and beneficial effects of the apparatus according to any one of the fourth aspect of the present invention or the implementations of the fourth aspect and implementation and beneficial effects of the method according to any one of the second aspect of the present invention or the implementations of the second aspect, refer to each other, and repeated parts are not described in detail again.

According to a fifth aspect, this application provides a base station. The base station includes: a processor and a transceiver, where the processor is configured to generate an arrangement indication; and the transceiver is configured to send the arrangement indication, where the arrangement indication is used to indicate an arrangement manner of a reference signal, the reference signal occupies at least one group of time frequency resources, and the arrangement manner is a frequency division manner, a time division manner, a frequency division+code division manner, or a time division+code division manner; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain; in the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and in the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

In a possible implementation, in the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, in the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, in the frequency division manner or the frequency division+code division manner, different groups of time frequency resources occupy a same quantity of subcarriers in frequency domain.

In a possible implementation, in the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

For implementation and beneficial effects of the base station according to any one of the fifth aspect of the present invention or the implementations of the fifth aspect and implementation and beneficial effects of the method according to any one of the first aspect of the present invention or the implementations of the first aspect, refer to each other, and repeated parts are not described in detail again.

According to a sixth aspect, this application further provides a readable storage medium, configured to store a software instruction used to perform a function of any one of the first aspect or the designs of the first aspect, and including a program designed to perform the method according to any one of the first aspect or the designs of the first aspect.

According to a seventh aspect, this application provides a terminal. The terminal includes: a processor and a transceiver, where the transceiver is configured to receive an arrangement indication, where the arrangement indication is used to indicate an arrangement manner of a reference signal; and the processor is configured to determine the arrangement manner of the reference signal based on the arrangement indication, where the reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

In a possible implementation, when the arrangement manner of the reference signal is the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In a possible implementation, when the arrangement manner of the reference signal is the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In a possible implementation, when the arrangement manner of the reference signal is the frequency division manner or the frequency division+code division manner, different groups of time frequency resources occupy a same quantity of subcarriers in frequency domain.

In a possible implementation, when the arrangement manner of the reference signal is the time division manner or the time division+code division manner, different groups of time frequency resources occupy a same quantity of symbols in time domain.

In a possible implementation, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

For implementation and beneficial effects of the terminal according to any one of the seventh aspect of the present invention or the implementations of the seventh aspect and implementation and beneficial effects of the method according to any one of the second aspect of the present invention or the implementations of the second aspect, refer to each other, and repeated parts are not described in detail again.

According to an eighth aspect, this application further provides a readable storage medium, configured to store a software instruction used to perform a function of any one of the second aspect or the designs of the second aspect, and including a program designed to perform the method according to any one of the second aspect or the designs of the second aspect.

DESCRIPTION OF EMBODIMENTS

The following describes embodiments of the present invention with reference to accompanying drawings.

To more clearly describe technical solutions provided in the embodiments of the present invention, this application first briefly describes a manner in which an RS occupies a time frequency resource in a current long term evolution (LTE) standard.

In a current LTE standard, an RS is usually mapped based on a requirement on an antenna port quantity and a fixed pilot pattern (which may also be referred to as an RS pattern). For a given port quantity, each RS port is mapped in a resource block (RB) based on a fixed rule, and RS functions are the same.

An existing standard supports an RS to multiplex in time domain and frequency domain in each subframe to improve spectrum efficiency. Common multiplexing manners are, for example, frequency division multiplexing (FDM), time division multiplexing (TDM), and code division multiplexing (CDM). In FDM, signals are distinguished based on a band; in TDM, signals are distinguished based on, for example but not limited to, an OFDM symbol or a timeslot; and in CDM, signals are distinguished based on an orthogonal code word.

For example, an RS is specifically a DMRS. Time-domain CDM may be performed on a DMRS in each subframe to improve spectrum efficiency, current single-user MIMO (SU-MIMO) supports a maximum of eight layers of orthogonal DMRS multiplexing, and a DMRS pilot occupies 24 resource elements (RE). Multi-user MIMO (MU-MIMO) supports a maximum of four layers of orthogonal DMRS multiplexing, and a DMRS pilot occupies 12 REs.

Figure 1:
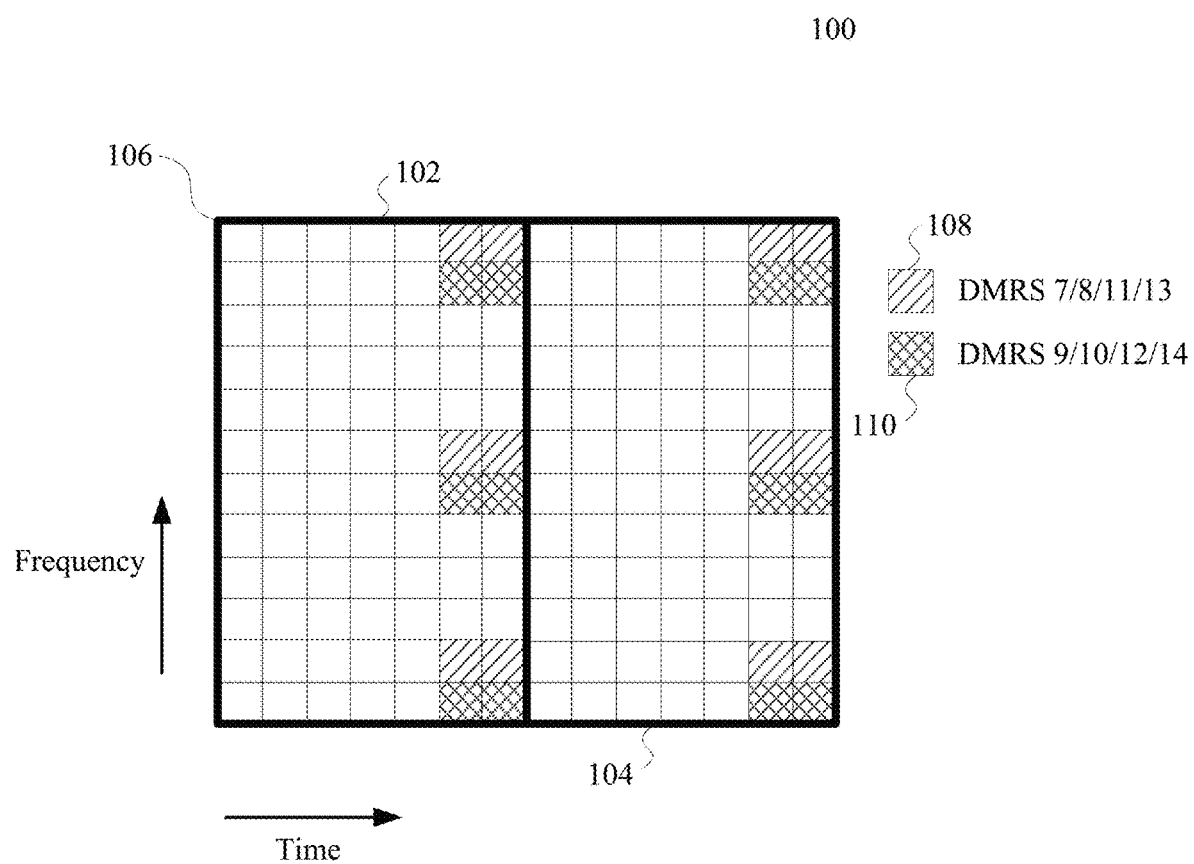
FIG. 1 is a schematic diagram of a DMRS resource distribution manner in a current LTE standard.

FIG. 1 is a schematic diagram of a DMRS resource arrangement manner in a current LTE standard. The resource arrangement manner 100 supports SU-MIMO transmission of a maximum of eight symbol flows (also referred to as spatial flows or data flows), and the symbol flows correspond to DMRS ports 7 to 14. As shown in FIG. 1, in an RB pair 106 including an RB 102 and an RB 104, a DMRS occupies a total of 24 REs, and the REs are distributed on six subcarriers (subcarriers 0, 1, 5, 6, 10, and 11 of each RB) in frequency domain and four symbols (symbols 5, 6, 12, and 13 of each subframe) in time domain.

Four REs distributed on a same subcarrier and occupied by a DMRS form a DMRS RE group, and therefore the 24 REs occupied by the DMRS may be divided into six DMRS RE groups. Each DMRS RE group of REs identified by a pattern 108 may be used to carry DMRSs of DMRS ports 7, 8, 11, and 13, and each DMRS RE group of REs identified by a pattern 110 may be used to carry DMRSs of DMRS ports 9, 10, 12, and 14.

Time-domain CDM of a DMRS port in each subframe has two modes:

DMRSs corresponding to two DMRS ports may be carried in each DMRS RE group by using two groups of orthogonal cover codes (OCC) in a CDM manner (or may be indicated as CDM that is two-dimensional in time domain, or CDM-2).

For example, based on FIG. 1, each DMRS RE group of REs identified by the pattern 108 carries DMRS ports 7 and 8, each DMRS RE group of REs identified by the pattern 110 carries DMRS ports 9 and 10, two-dimensional CDM is performed for the ports 7 and 8 and the ports 9 and 10 in time domain, and an FDM multiplexing manner is used between the ports 7, 8 and the ports 9, 10.

Alternatively, DMRSs corresponding to four DMRS ports may be carried in each DMRS RE group by using four groups of OCCs in a CDM manner (or may be indicated as CDM that is four-dimensional in time domain, or CDM-4).

For example, still based on FIG. 1, each DMRS RE group of REs identified by the pattern 108 is used to carry DMRS ports 7, 8, 11, and 13, each DMRS RE group of REs identified by the pattern 110 is used to carry DMRS ports 9, 10, 12, and 14, four-dimensional CDM is performed for the ports 7, 8, 11, and 13 and the ports 9, 10, 12, and 14 in time domain, and an FDM multiplexing manner is used between the ports 7, 8, 11, and 13, and the ports 9, 10, 12, and 14.

For example, in a four-dimensional CDM multiplexing manner in time domain, orthogonal cover codes of four REs in each DMRS RE group corresponding to each DMRS port may be shown in the following Table 1.

TABLE 1

Example of orthogonal cover codes of four REs
in a DMRS RE group corresponding to a DMRS port

| DMRS port | OCC code |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

It can be learned from FIG. 1 that, DMRSs of each DMRS port occupy three DMRS RE groups, and the three DMRS RE groups are distributed on three subcarriers. Four REs included in each DMRS RE group are distributed on four OFDM symbols. Each DMRS RE group may carry, by using two groups of OCCs in a CDM manner, DMRSs corresponding to two DMRS ports, or may carry, by using four groups of OCCs in a CDM manner, DMRSs corresponding to four DMRS ports.

The foregoing roughly describes a current DMRS resource allocation and multiplexing rule in an example. It should be noted that the DMRS resource arrangement manner is only an example of a plurality of current DMRS resource arrangement manners in LTE, and different DMRS resource arrangement manners may be used in different scenarios based on a current LTE standard. For example, a DMRS resource arrangement manner in an MU-MIMO scenario may be different from a DMRS resource arrangement manner in an SU-MIMO scenario. For another example, if maximum quantities of symbol flows simultaneously scheduled are different, DMRS resource arrangement manners may be different. Therefore, a person skilled in the art should understand that the foregoing DMRS resource arrangement manner is not intended to limit the scope of the technical solutions provided in the embodiments of the present invention. In a specific implementation process, another DMRS resource arrangement manner may also be used.

It can be learned from the example of the DMRS resource arrangement manner that, in a current LTE standard, an RS is usually mapped in a PRB based on a total antenna port quantity by using a fixed pilot pattern, and each RS port has a same function. As 5G NR puts forward multi-scenario, multiband, and multi-transmission-mode requirements, the current RS mapping and configuration solution characterized by a fixed mapping manner and a single function cannot satisfy complex and diversified communication scenarios in the future.

For example, in a typical scenario, namely, a high-speed scenario that needs to be considered in a next-generation communications system, a time-domain CDM mode used in the foregoing example of the DMRS resource arrangement is inapplicable. In the high-speed scenario, a fast channel time variation results in a fast channel change in different OFDM symbols of a subframe. Therefore, channel relevancy in a DMRS RE group becomes poor, degrading time-domain CDM performance, increasing a channel estimation error, and degrading system performance.

For another example, in another typical scenario, namely, a high-frequency scenario that needs to be considered in a next-generation communications system, a time-domain CDM mode used in the foregoing example of the DMRS resource arrangement is also inapplicable. In the high-frequency scenario, different OFDM symbols in time domain are affected by phase noise, and phase noise of a channel is different in different OFDM symbols. Therefore, time-domain CDM performance and system performance are degraded.

In addition, because a current time-domain CDM mode is fixed, design cannot be made based on characteristics of different scenarios. In some low-frequency selection scenario, the current configuration solution supporting only time-domain CDM cannot use a characteristic of flatness of a channel in frequency domain, resulting in performance gain loss.

To resolve a disadvantage that the current RS mapping and configuration solution characterized by a fixed mapping manner and a single function cannot satisfy a future communications system requirement, and cannot be applied to a scenario in which a system has a plurality of waveforms and different transmission properties of a port need to be compensated, solutions that may be considered, for example, include the following: A plurality of RS ports are irregularly mapped in a pilot pattern, different port multiplexing manners are configured, a pilot may carry a plurality of different functions, and densities may be configured for different ports.

Based on the foregoing considerations, an embodiment of the present invention provides an indication solution, mainly used to flexibly configure a port multiplexing manner of a reference signal. A plurality of selectable arrangement manners of the reference signal are provided, and an arrangement manner of the reference signal is indicated, so that a system can dynamically and flexibly indicate arrangement of the reference signal based on different scenarios and transmission requirements, to implement more reliable data transmission.

Specifically, in an indication solution provided in some embodiments of the present invention, a base station may generate and send an arrangement indication. The arrangement indication indicates an arrangement manner of a reference signal, the arrangement manner indicated by the arrangement indication may be specifically a frequency division manner, a time division manner, a frequency division+code division manner, or a time division+code division manner, and the reference signal occupies at least one group of time frequency resources. The four selectable arrangement manners may be specifically described as follows:

If the arrangement manner of the reference signal is the frequency division manner, each group of time frequency resources occupy a symbol in time domain and at least one contiguous subcarrier in frequency domain. If the arrangement manner of the reference signal is the time division manner, each group of time frequency resources occupy at least one contiguous symbol in time domain and a subcarrier in frequency domain. If the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal. For example, the reference signal and another reference signal are multiplexed on each group of time frequency resources together by using the orthogonal code (for example but not limited to, an OCC) of the reference signal. If the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal. Similarly, the reference signal and another reference signal may be multiplexed on each group of time frequency resources together by using the orthogonal code of the reference signal.

It can be learned that, in the indication solution provided in this embodiment of the present invention, the base station can dynamically and flexibly configure the arrangement manner of the RS in different scenarios based on different transmission requirements and the four selectable arrangement manners, to implement more reliable data transmission.

Specifically, in some embodiments of the present invention, a sending period of the arrangement indication of the reference signal may be configured. For example, when detecting that a channel drastically changes in time domain or a channel drastically changes in frequency domain, the base station may generate and send the arrangement indication, to instruct the reference signal to be arranged in an arrangement manner that can obtain better performance.

In addition, the arrangement indication of the reference signal may be specifically sent in a manner such as radio resource control (RRC), downlink control information (DCI), media access control (MAC), or the like.

It can be learned that, in the indication solution provided in this embodiment of the present invention, it is equivalent to providing a technical solution by using which a reference signal multiplexing manner can be dynamically configured. Related indication signaling is introduced on a base station side. Therefore, the base station may freely configure a port multiplexing manner in different scenarios by using few signaling indication resources, thereby satisfying a requirement that a complex and fickle scenario needs to be supported in a next-generation communications system. In a scenario such as a high-speed scenario, a high-frequency scenario, or a high-frequency selection scenario, the arrangement manner of the reference signal is flexibly configured to obtain higher channel estimation precision, so that data demodulation is more accurate in a plurality of scenarios.

Figure 2:
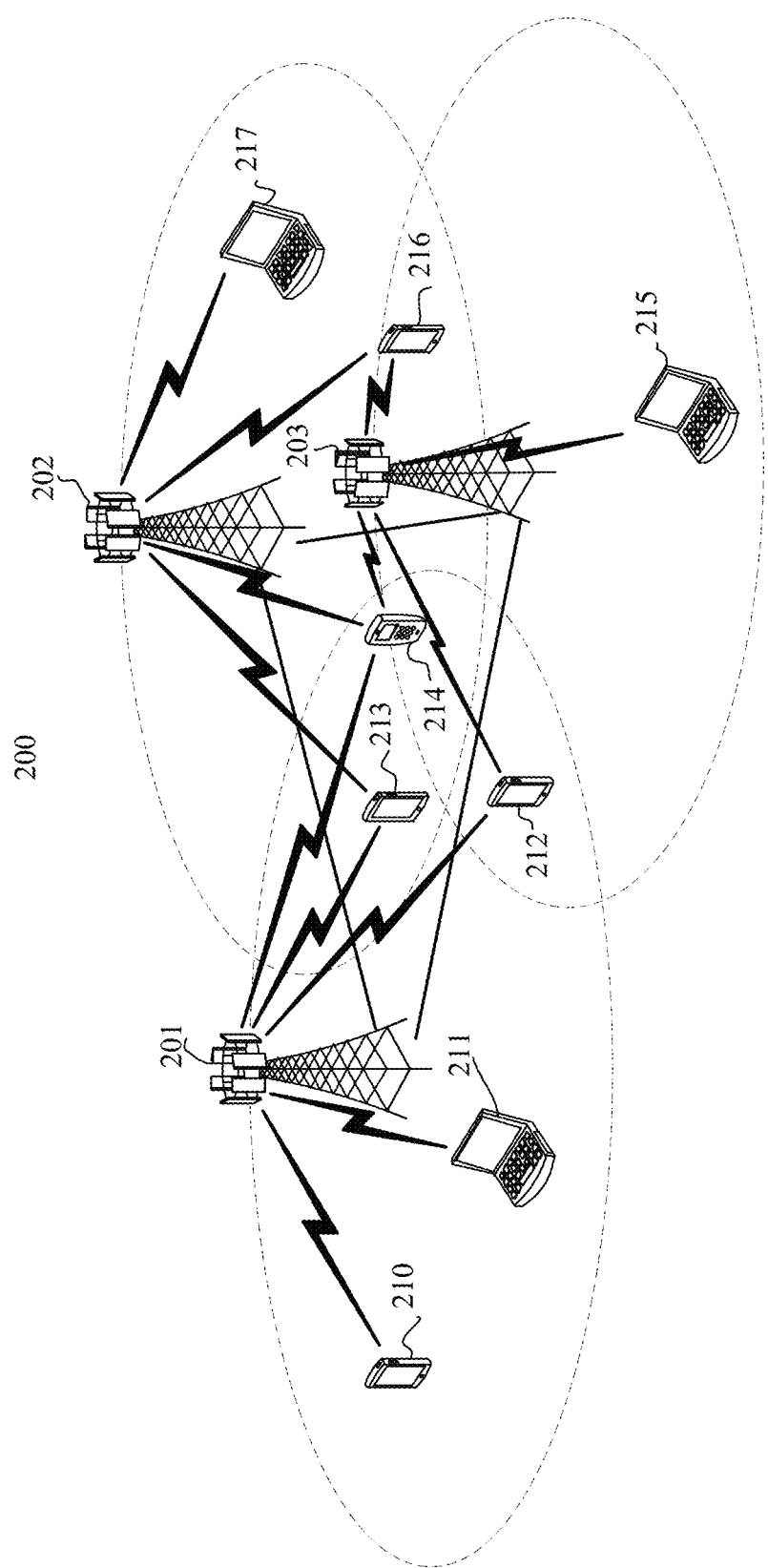
FIG. 2 is a schematic architectural diagram of a wireless communications system according to some embodiments of the present invention.

To more clearly describe the technical solution provided in this embodiment of the present invention, FIG. 2 is a schematic architectural diagram of a wireless communications system according to some embodiments of the present invention.

As shown in FIG. 2, a wireless communications network 200 includes base stations 201 to 203 and terminals 210 to 217. The base stations 201 to 203 may communicate with each other by using a backhaul link (for example, shown by a straight line between the base stations 201 to 203), and the backhaul link may be a wired backhaul link (for example, an optic fiber or a copper cable) or may be a wireless backhaul link (for example, a microwave). The terminals 210 to 217 may communicate with the corresponding base stations 201 to 203 by using a radio link (for example, shown by a curved line between the base stations 201 to 203 and the terminals 210 to 217).

The base stations 201 to 203 are configured to provide a wireless access service to the terminals 210 to 217. Specifically, each base station corresponds to a service coverage area (which may also be referred to as a cell, as shown by each elliptic area in FIG. 2), and a terminal entering the area may communicate with the base station by using a radio signal, to accept the wireless access service provided by the base station. Service coverage areas of the base stations may overlap, and a terminal in an overlapped area may receive radio signals from a plurality of base stations. Therefore, the base stations may coordinate with each other, to provide a service to the terminal. For example, a plurality of base stations may provide the service to the terminal in the overlapped area by using a coordinated multipoint (CoMP) technology.

For example, as shown in FIG. 2, service coverage areas of the base station 201 and the base station 202 overlap, and the terminal 213 is in an overlapped area. Therefore, the terminal 213 may receive radio signals from the base station 201 and the base station 202, and the base station 201 and the base station 202 may coordinate with each other, to provide a service to the terminal 213. For another example, as shown in FIG. 2, service coverage areas of the base station 201, the base station 202, and the base station 203 include a common overlapped area, and the terminal 214 is in the overlapped area. Therefore, the terminal 214 may receive radio signals from the base station 201, the base station 202, and the base station 203, and the base station 201, the base station 202, and the base station 203 may coordinate with each other, to provide a service to the terminal 214.

Depending on a used wireless communications technology, the base station may also be referred to as a NodeB, an evolved NodeB (eNodeB), an access point (AP), or the like. In addition, based on sizes of provided service coverage areas, the base stations may be further divided into macro base stations used for providing macro cells, micro base stations used for providing pico cells, and femto base stations used for providing femto cells. With continuous evolution of wireless communications technologies, a future base station may also use another name.

The terminals 210 to 217 may be various wireless communications devices having wireless communications functions. The terminal is, for example but not limited to, a mobile cellular phone, a cordless phone, a personal digital assistant (PDA), a smartphone, a notebook computer, a tablet computer, a wireless data card, a wireless modem (Modulator demodulator, Modem), or a wearable device such as a smartwatch. With emergence of internet of things (IoT) technologies, more devices that previously do not have communications functions, for example but not limited to, household appliances, vehicles, tool devices, service devices, and service facilities, are provided with wireless communications units and start to obtain wireless communications functions, to access the wireless communications network and to be remotely controlled. Such devices are provided with the wireless communications units and have the wireless communications functions, and therefore also belong to a scope of wireless communications devices. In addition, the terminals 210 to 217 may also be referred to as mobile stations, mobile devices, mobile terminals, wireless terminals, handheld devices, clients, or the like.

A plurality of antennas may be configured in both the base stations 201 to 203 and the terminals 210 to 217, to support a MIMO technology. Further, the base stations 201 to 203 and the terminals 210 to 217 can support both an SU-MIMO technology and an MU-MIMO technology. MU-MIMO may be implemented based on a space division multiple access (SDMA) technology. Because a plurality of antennas are configured, the base stations 201 to 203 and the terminals 210 to 217 can further flexibly support a single-input single-output (SISO) technology, a single-input multiple-output (SIMO) technology, and a multiple-input single-output (MISO) technology, to implement various diversity (for example but not limited to, transmit diversity and receive diversity) and multiplexing technologies. The diversity technology may include, for example but not limited to, a transmit diversity (TD) technology and a receive diversity (RD) technology. The multiplexing technology may be a spatial multiplexing technology. The foregoing technology may further include a plurality of implementation solutions. For example, the transmit diversity technology may include diversity manners such as space time transmit diversity (STTD), space-frequency transmit diversity (SFTD), time switched transmit diversity (TSTD), frequency switched transmit diversity (FSTD), orthogonal transmit diversity (OTD), cyclic delay diversity (CDD), and diversity manners obtained through derivation, evolution, and combination of the foregoing diversity manners. For example, a current LTE standard uses transmit diversity manners such as space time block coding (STBC), space frequency block coding (SFBC), and CDD.

The foregoing summarizes examples of transmit diversity. A person skilled in the art should understand that transmit diversity further includes a plurality of other implementations in addition to the foregoing examples. Therefore, the foregoing descriptions should not be understood as limitation on the technical solutions of the present invention, and the technical solutions of the present invention should be understood as being applicable to various possible transmit diversity solutions.

In addition, the base stations 201 to 203 and the terminals 210 to 217 may communicate by using various wireless communications technologies, for example but not limited to, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, and evolved and derived technologies of these technologies. The foregoing wireless communications technologies are used in many wireless communication standards as radio access technologies (RAT), and therefore construct current well-known various wireless communications systems (or networks), including but not limited to global system for mobile communications (GSM), CDMA2000, wideband CDMA (WCDMA), Wi-Fi defined in a series of 802.11 standards, worldwide interoperability for microwave access (WiMAX), LTE, LTE-A, evolved systems of the wireless communications systems, and the like. Unless otherwise specified, the technical solutions provided in the embodiments of the present invention may be applied to the foregoing wireless communications technologies and wireless communications systems. In addition, the terms "system" and "network" can be interchanged with each other.

It should be noted that the wireless communications network 200 shown in FIG. 2 is only an example, and is not intended to limit the technical solutions of the present invention. A person skilled in the art should understand that in a specific implementation process, the wireless communications network 200 may further include another device, and quantities of base stations and terminals may be configured based on a specific requirement.

Figure 3:
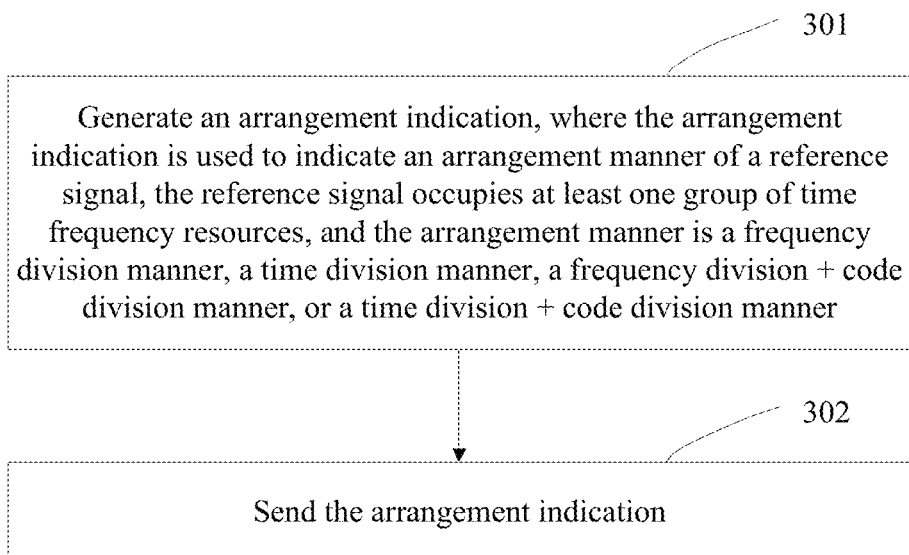
FIG. 3 is a schematic flowchart of an indication method according to some embodiments of the present invention.

FIG. 3 is a schematic flowchart of an indication method according to some embodiments of the present invention. A procedure shown in FIG. 3 may be implemented by a base station. For example, the base station shown in FIG. 2 may be configured with a physical or functional module configured to perform the procedure shown in FIG. 3, and the functional module configured to perform the procedure may be implemented by hardware, software programming, or a combination of software and hardware.

For ease of description, the following uses an example in which the base station is configured to perform the procedure shown in FIG. 3, to provide detailed descriptions.

As shown in FIG. 3, the procedure includes the following steps.

Step 301: Generate an arrangement indication, where the arrangement indication is used to indicate an arrangement manner of a reference signal, the reference signal usually occupies at least one group of time frequency resources, and the arrangement manner of the reference signal may be understood as a manner in which the reference signal occupies a time frequency resource in time domain and frequency domain.

Step 302: Send the generated arrangement indication.

As shown in FIG. 3, in some embodiments of the present invention, the arrangement manner of the reference signal may include but is not limited to any one of the following: a frequency division manner, a time division manner, a frequency division+code division manner, or a time division+code division manner.

Specifically, the reference signal occupies at least one group of time frequency resources, and for the time frequency resource occupied by the reference signal, descriptions are as follows:

If the arrangement manner of the reference signal indicated by the arrangement indication is the frequency division manner, each group of time frequency resources occupy a symbol in time domain and at least one contiguous subcarrier in frequency domain.

If the arrangement manner of the reference signal indicated by the arrangement indication is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal. For example, in the arrangement manner, the reference signal and another reference signal may be multiplexed on each group of time frequency resources together by using the orthogonal code (for example but not limited to, an OCC) of the reference signal.

If the arrangement manner of the reference signal indicated by the arrangement indication is the time division manner, each group of time frequency resources occupy at least one contiguous symbol in time domain and a subcarrier in frequency domain.

If the arrangement manner of the reference signal indicated by the arrangement indication is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal. Similarly, in the arrangement manner, the reference signal and another reference signal may be multiplexed on each group of time frequency resources together by using the orthogonal code (for example but not limited to, an OCC) of the reference signal.

Specifically, in some embodiments of the present invention, the base station may determine the arrangement manner of the reference signal based on a channel change characteristic in time domain and frequency domain for indication.

For example, when a channel drastically changes in time domain but slowly changes in frequency domain, the base station may indicate that the reference signal is arranged on the time frequency resource based on the frequency division manner or the frequency division+code division manner, to obtain a performance gain by using a property of flatness of the channel in frequency domain. The code division manner is mainly used to help improve spectrum efficiency.

For another example, when a channel slowly changes in time domain but drastically changes in frequency domain, the base station may indicate that the reference signal is arranged on the time frequency resource based on the time division manner or the time division+code division manner, to obtain a performance gain by using a property of flatness of the channel in time domain. The code division manner is also mainly used to help improve spectrum efficiency.

Specifically, the code division manner, for example, may be CDM-2 or CDM-4. Considering that CDM-2 usually can obtain a better performance gain than CDM-4, in some embodiments of the present invention, the code division manner may be specifically CDM-2.

In the procedure shown in FIG. 3, the base station can flexibly configure the arrangement manner of the reference signal in different scenarios based on transmission requirements of the different scenarios and the selectable arrangement manners. Therefore, in different scenarios, it is indicated that the reference signal is arranged based on the arrangement manner that can obtain a better performance gain, so that higher channel estimation precision can be obtained and more reliable data transmission is implemented.

For example, in some embodiments of the present invention, it is assumed that a transmission scenario is a high-speed scenario (for example, the terminal is in a high-speed motion state). In the scenario, a channel greatly changes at different moments, but does not change greatly in frequency domain. In consideration of the characteristic in the scenario, the base station may generate, from a perspective of the frequency domain, the arrangement indication used to indicate that the reference signal is arranged based on the frequency domain manner (for example, the frequency division manner or the frequency division+code division manner), to obtain a performance gain by effectively using a property of flatness of the channel in frequency domain.

For another example, in some embodiments of the present invention, it is assumed that a transmission scenario is a high-frequency selection scenario. In the scenario, a channel does not greatly change at different moments, but changes greatly in frequency domain. In consideration of the characteristic in the scenario, the base station may generate, from a perspective of the time domain, the arrangement indication used to indicate that the reference signal is arranged based on the time domain manner (for example, the time division manner or the time division+code division manner), to obtain a performance gain by effectively using a property of flatness of the channel in time domain.

To more clearly describe the arrangement manner, similar to an RB, an RB pair (RB pair), a subframe, or another resource structure in an LTE standard, some embodiments of the present invention provide a resource unit (Resource Unit). The resource unit may be used as a basic unit based on which resource allocation is performed for a scheduled user, or may be used to describe the arrangement manner of the reference signal.

Specifically, in the embodiments of the present invention, at least one group of time frequency resources occupied by the reference signal may be specifically at least one group of time frequency resources in a resource unit. For example, the RS pattern shown in FIG. 1 is used as an example. An uppermost subcarrier (the eleventh subcarrier) corresponding to the pattern 108 and four REs corresponding to four OFDM symbols (symbols 5, 6, 12, and 13 in each subframe) form a group of time frequency resources.

Figure 4:
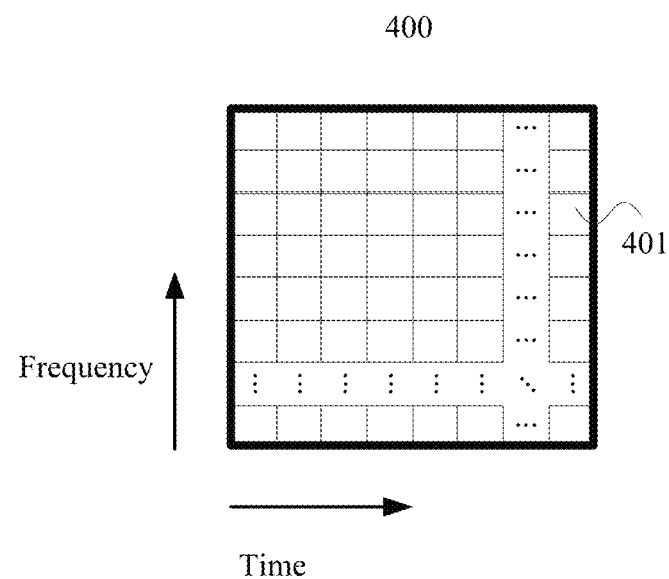
FIG. 4 is a schematic structural diagram of a resource unit according to some embodiments of the present invention.

FIG. 4 is a schematic structural diagram of a resource unit according to some embodiments of the present invention. As shown in FIG. 4, the resource unit 400 occupies a plurality of contiguous subcarriers in frequency domain and a plurality of contiguous symbols (OFDM symbols) in time domain. A minimum resource unit in a resource unit is an RE 401, and each RE occupies a subcarrier in frequency domain and a symbol in time domain. The resource unit 400 usually includes a plurality of REs. Similar to an RB and an RB pair in an LTE standard, the resource unit shown in FIG. 4 may be used as a basic unit based on which resource allocation is performed for a scheduled user, or may be used to describe the arrangement manner of the reference signal.

Based on the example of the resource unit shown in FIG. 4, in some embodiments of the present invention:

when the arrangement manner of the reference signal is the frequency division manner, each of the at least one group of time frequency resources occupied by the reference signal may specifically include some REs that are contiguous in a column direction (equivalent to being contiguous in frequency domain) in a column of REs (equivalent to a symbol in time domain) of the resource unit 400 shown in FIG. 4;

when the arrangement manner of the reference signal is the time division manner, each of the at least one group of time frequency resources occupied by the reference signal may specifically include some REs that are contiguous in a row direction (equivalent to being contiguous in time domain) in a row of REs (equivalent to a subcarrier in frequency domain) of the resource unit 400 shown in FIG. 4;

when the arrangement manner of the reference signal is the frequency division manner+code division manner, each of the at least one group of time frequency resources occupied by the reference signal may include some REs that are contiguous in a column direction in a column of REs of the resource unit 400 shown in FIG. 4, and the REs that are contiguous in the column direction may carry the reference signal in a CDM manner by using an orthogonal code (for example, an OCC) corresponding to the reference signal, that is, the reference signal and another reference signal are multiplexed on a group of time frequency resources together by using the orthogonal code of the reference signal; and when the arrangement manner of the reference signal is the time division manner+code division manner, each of the at least one group of time frequency resources occupied by the reference signal may include some REs that are contiguous in a row direction in a row of REs of the resource unit 400 shown in FIG. 4, and the REs that are contiguous in the row direction may carry the reference signal in a CDM manner by using an orthogonal code (for example, an OCC) corresponding to the reference signal, that is, the reference signal and another reference signal are multiplexed on a group of time frequency resources together by using the orthogonal code of the reference signal.

Specifically, considering that the reference signal usually may occupy a plurality of groups of time frequency resources, for example, the time frequency resources occupied by the DMRS shown in FIG. 1, to ensure that when the reference signal occupies a plurality of groups of time frequency resources, the effect described in the embodiments of the present invention can also be obtained by flexibly configuring the arrangement manner, in some embodiments of the present invention, if the reference signal occupies at least two groups of time frequency resources:

when the arrangement manner of the reference signal is the frequency division manner or the frequency division+code division manner, each of a plurality of groups of time frequency resources occupied by the reference signal may occupy a same symbol in time domain, and subcarriers occupied by each group of time frequency resources in frequency domain do not overlap, that is, any subcarrier occupied by any group of time frequency resources in frequency domain is different from that occupied by another group; and still based on the resource unit shown in FIG. 4, when the arrangement manner of the reference signal is the frequency division manner or the frequency division+code division manner, each of a plurality of groups of time frequency resources occupied by the reference signal may include some REs that are contiguous in a column direction in a column of REs of the resource unit 400 shown in FIG. 4, and the REs that are contiguous in the column direction included in each group of time frequency resources do not overlap, where specifically, in some embodiments of the present invention, when the reference signal is arranged based on the frequency division manner or the frequency division+code division manner, quantities of subcarriers occupied by different groups of time frequency resources in frequency domain may be the same;

when the arrangement manner of the reference signal is the time division manner or the frequency division+code division manner, a plurality of groups of time frequency resources occupied by the reference signal may occupy a same subcarrier in frequency domain, and symbols occupied by each group of time frequency resources in time domain do not overlap, that is, any symbol occupied by any group of time frequency resources in time domain is different from that occupied by another group; and still based on the resource unit shown in FIG. 4, when the arrangement manner of the reference signal is the time division manner or the time division+code division manner, each of a plurality of groups of time frequency resources occupied by the reference signal may include some REs that are contiguous in a row direction in a row of REs of the resource unit 400 shown in FIG. 4, and the REs that are contiguous in the row direction included in each group of time frequency resources do not overlap.

Correspondingly, in some embodiments of the present invention, when the reference signal is arranged based on the time division manner or the time division+code division manner, quantities of symbols occupied by different groups of time frequency resources in time domain may be the same.

In consideration of reducing system complexity, in some embodiments of the present invention, the base station may generate and send the arrangement indication in different scenarios based on a fixed RS pattern, to dynamically switch the arrangement manner of the reference signal in the same RS pattern.

Specifically, in some embodiments of the present invention, to dynamically switch the arrangement manner of the reference signal in the same RS pattern, a quantity of subcarriers in frequency domain that are occupied by any group of time frequency resources in the frequency division manner or the frequency division+code division manner may be equal to a quantity of symbols in time domain that are occupied by any group of time frequency resources in the time division manner or the time division+code division manner. In other words, a quantity of REs that are occupied by any group of time frequency resources in the frequency division manner or the frequency division+code division manner may be equal to a quantity of REs that are occupied by any group of time frequency resources in the time division manner or the time division+code division manner.

A DMRS is still used as an example. Based on the example of the resource unit shown in FIG. 4, FIG. 5 shows a DMRS arrangement example in a DMRS pattern according to some embodiments of the present invention.

Figure 5:
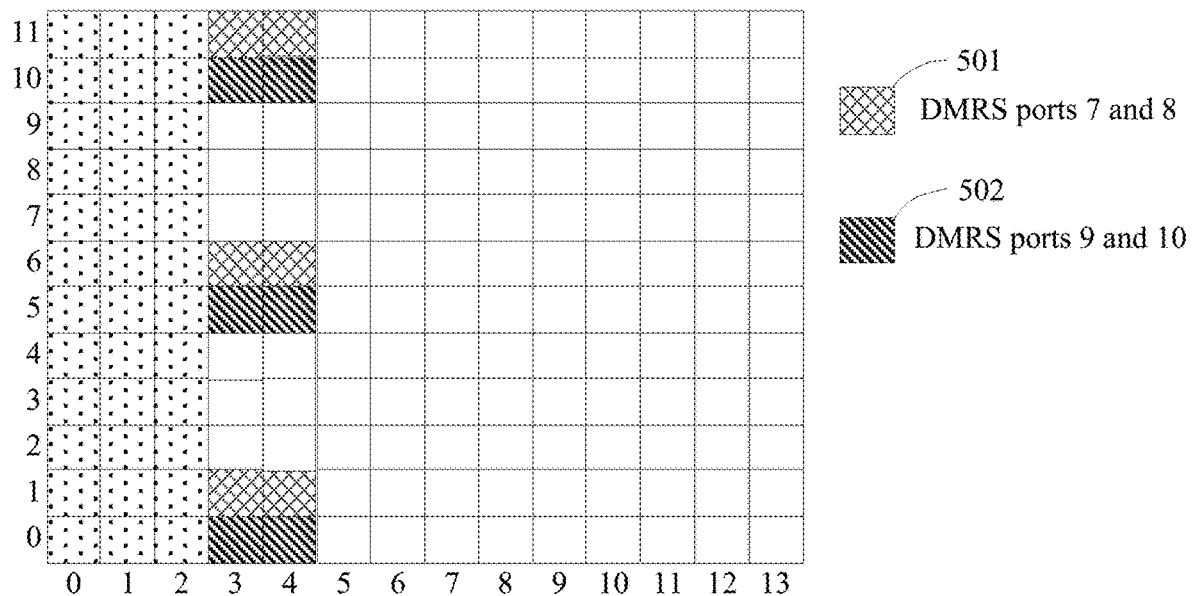
FIG. 5 is a schematic diagram of DMRS arrangement in a DMRS pattern according to some embodiments of the present invention.

As shown in FIG. 5, in the DMRS pattern, a DMRS occupies 12 REs, and the REs are distributed on six subcarriers (subcarriers 0, 1, 5, 6, 10, and 11) in frequency domain and two symbols (symbols 3 and 4) in time domain. It is assumed that in the DMRS pattern, an arrangement manner of the DMRS is initialized as that two contiguous REs distributed on a same subcarrier and occupied by the DMRS form a DMRS RE group (equivalent to a group of time frequency resources described above). Each of three DMRS RE groups identified by a pattern 501 carries DMRSs of DMRS ports 7 and 8 by using two groups of OCCs, and each of three DMRS RE groups identified by a pattern 502 carries DMRSs of DMRS ports 9 and 10 by using two groups of OCCs. The arrangement manner of the DMRS in the DMRS pattern may be considered as the time division+code division manner. This manner can obtain a performance gain when the channel is flat in time domain.

Figure 6:
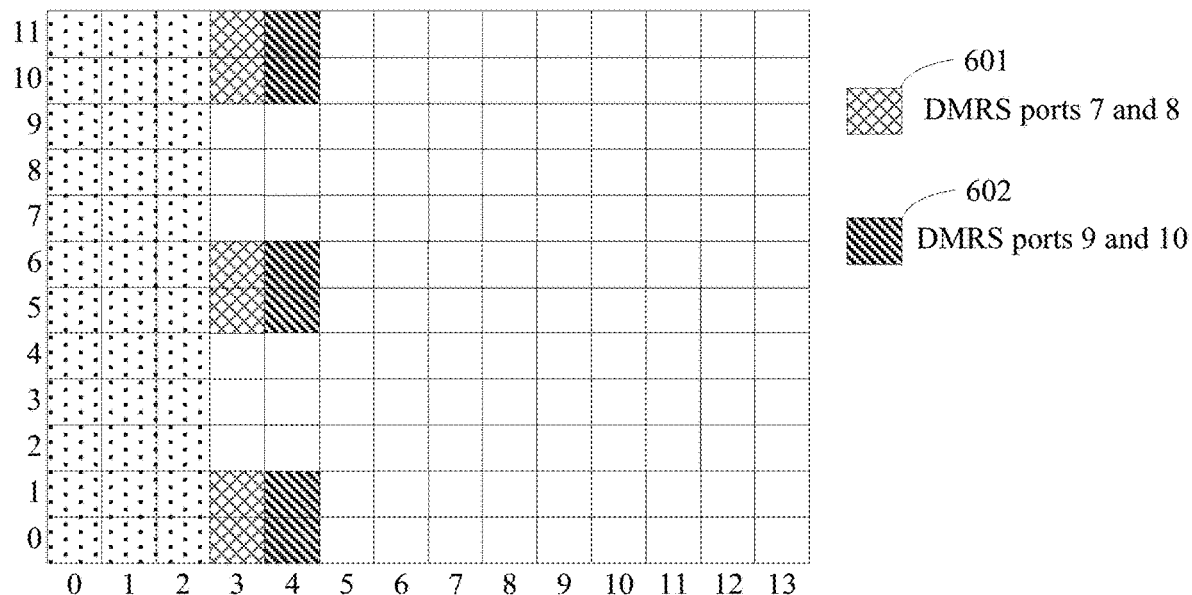
FIG. 6 is a schematic diagram of DMRS re-arrangement based on a same DMRS pattern according to some embodiments of the present invention.

If the base station detects that the terminal is currently in the high-speed scenario, and the channel drastically changes in time domain and slowly changes in frequency domain, the base station determines that the arrangement manner of the DMRS needs to be switched to an arrangement manner that can obtain better performance. Based on the current scenario, the base station may determine that arrangement of the DMRS may be currently switched to the frequency division manner or the frequency division+code division manner, to effectively use a property of flatness of the channel in frequency domain. Based on the DMRS pattern shown in FIG. 5, the base station may generate and send the arrangement indication. The arrangement indication is used to indicate that the arrangement manner of the DMRS is switched to the frequency division or the frequency division+code division manner. FIG. 6 shows an example of DMRS re-arrangement based on a same DMRS pattern according to some embodiments of the present invention.

As shown in FIG. 6, the DMRS is re-arranged in the DMRS pattern shown in FIG. 5, the DMRS still occupies 12 REs, and the REs are distributed on six subcarriers (subcarriers 0, 1, 5, 6, 10, and 11) in frequency domain and two symbols (symbols 3 and 4) in time domain. Two contiguous REs distributed on a same symbol and occupied by the DMRS form a DMRS RE group (equivalent to a group of time frequency resources described above). Each of three DMRS RE groups identified by a pattern 601 carries DMRSs of DMRS ports 7 and 8 by using two groups of OCCs, and each of three DMRS RE groups identified by a pattern 602 carries DMRSs of DMRS ports 9 and 10 by using two groups of OCCs. It can be learned that, the arrangement manner of the DMRS may be considered as the frequency division+code division manner. Therefore, when the terminal is currently in the high-speed scenario, this arrangement manner shown in FIG. 6 can obtain a performance gain when the channel is flat in frequency domain.

It can be learned that, in the foregoing manner, the system can dynamically switch the arrangement manner of the reference signal in a fixed RS pattern, and therefore can reduce system complexity to some extent, and can satisfy a requirement that a next-generation communications system needs to support a complex and fickle scenario, so that in the high-speed scenario, the high-frequency scenario, the high-frequency selection scenario, or the like, the system obtains higher channel estimation precision, and data demodulation is more accurate in a plurality of scenarios.

Specifically, in some embodiments of this aspect, the arrangement indication may include a reference signal identifier. The reference signal identifier may be specifically, for example but not limited to, an antenna port number.

Specifically, a sending period of the arrangement indication may be configured, and for example, may be a preset initial value. That is, the base station may indicate the arrangement manner of the reference signal based on a specified period; or the base station may indicate the arrangement manner of the reference signal in real time. For example, when detecting that the channel drastically changes and the reference signal needs to be sent again to perform channel measurement, the base station may send the arrangement indication to the terminal.

In some embodiments of the present invention, in consideration of a requirement of dynamically adjusting the arrangement manner of the reference signal in different scenarios, when detecting that a transmission environment of the terminal changes, the base station may indicate that the arrangement manner of the reference signal is switched to an arrangement manner that can obtain a better performance gain in the current transmission environment of the terminal. For example, when it is detected that the terminal is in a high-speed motion state, the arrangement manner of the reference signal may be switched to the frequency division manner or the frequency division+code division manner.

Specifically, the frequency division manner and the time division manner may be indicated by a bit (bit) in the arrangement indication, and the frequency division+code division manner and the time division+code division manner may also be correspondingly indicated by a bit in the arrangement indication. A value change of the bit implements switching of the arrangement manner. It can be learned that, in the foregoing manner, the base station can indicate the arrangement manner of the reference signal by using few signaling indication resources.

Specifically, the arrangement indication may be sent by using one of the following signaling: physical layer signaling, media access control layer signaling, and radio resource control signaling. However, this constitutes no limitation.

The physical layer signaling may also be referred to as layer 1 (L1) signaling, and usually may be carried by a control part in a physical layer frame. A typical example of the L1 signaling is downlink control information (DCI) carried in a physical downlink control channel (PDCCH) defined in an LTE standard. In some cases, the L1 signaling may alternatively be carried by a data part in the physical layer frame. It is not difficult to see that a sending period or a signaling period of the L1 signaling is usually a period of the physical layer frame. Therefore, this type of signaling is usually used to implement dynamic control, to transfer frequently changing information. For example, resource allocation information may be transferred by using the physical layer signaling.

The media access control (MAC) layer signaling is layer 2 signaling, and usually may be carried by, for example, a frame header of a layer 2 frame. However, this constitutes no limitation. The frame header may further carry, for example, information such as a source address and a destination address. However, this constitutes no limitation. In addition to the frame header, the layer 2 frame usually further includes a frame body. In some cases, the L2 signaling may alternatively be carried by the frame body of the layer 2 frame. A typical example of the layer 2 signaling is signaling carried in a frame control field of a frame header of a MAC frame in a series of 802.11 standards, or a MAC control entity (Control Entity, MAC) defined in some protocols. The layer 2 frame usually may be carried in a data part of the physical layer frame. The resource indication information may be alternatively sent by using other layer 2 signaling in addition to the media access control layer signaling.

The radio resource control (RRC) signaling is layer 3 (Layer 3) signaling, and is usually some control messages, and the L3 signaling usually may be carried in a frame body of a layer 2 frame. A sending period or a control period of the L3 signaling is usually relatively long, and is suitable for sending information that does not frequently change. For example, in some existing communication standards, the L3 signaling is usually used to carry some configuration information. The resource indication information may be alternatively sent by using other layer 3 signaling in addition to the RRC signaling.

The foregoing describes only principles of the physical layer signaling, the MAC layer signaling, the RRC signaling, the layer 1 signaling, the layer 2 signaling, and the layer 3 signaling. For details of the three types of signaling, refer to the prior art, and details are not described in this specification.

To more clearly describe the technical solutions described in the embodiments of the present invention, based on two specific scenario examples, the following describes an example of the arrangement manner of the reference signal provided in some embodiments of the present invention.

Figure 7:
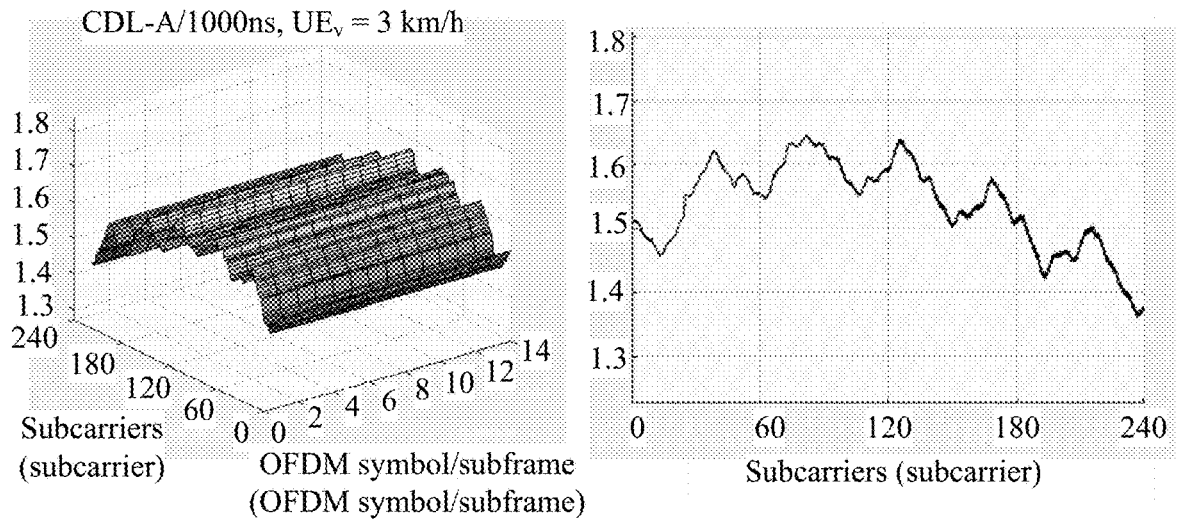
FIG. 7 is a schematic diagram of a channel property in a high-frequency selection scenario according to some embodiments of the present invention.

Scenario 1: High-frequency selection scenario:

FIG. 7 is a schematic diagram of a channel property in a high-frequency selection scenario according to some embodiments of the present invention. As shown in FIG. 7, a characteristic of the scenario is that a channel drastically changes in frequency domain and slowly changes in time domain. Therefore, in some embodiments of the present invention, the base station may generate the arrangement indication used to indicate that the reference signal is arranged based on the time division or the time division+code division manner, and send the generated arrangement indication to the terminal, to obtain a performance gain by effectively using the property of flatness of the channel in time domain.

Figure 8:
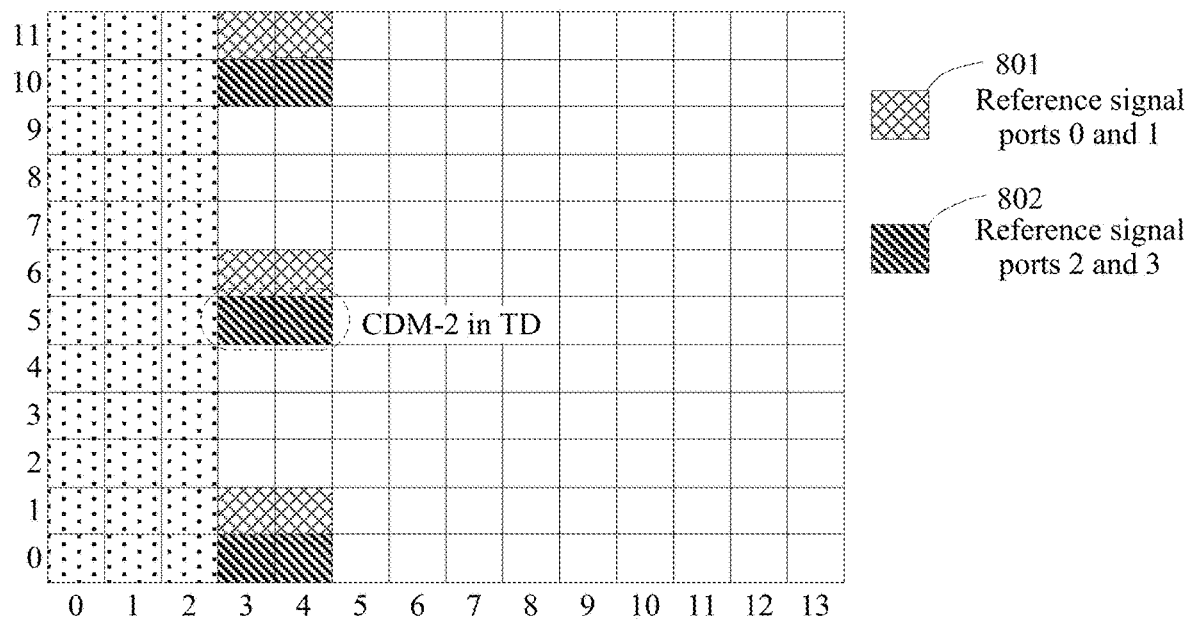
FIG. 8 is a schematic diagram of an arrangement manner of a reference signal in a high-frequency selection scenario according to some embodiments of the present invention.

Specifically, FIG. 8 is a schematic diagram of an arrangement manner of a reference signal in a high-frequency selection scenario according to some embodiments of the present invention.

As shown in FIG. 8, reference signal ports 0 and 1 and reference signal ports 2 and 3 are arranged on a time frequency resource based on the time division+code division manner (CDM-2 in TD (Time Domain) identified in the figure). Reference signals corresponding to the reference signal ports 0 and 1 occupy three groups of time frequency resources (for example, a pattern 801). Each group of time frequency resources occupy two contiguous symbols (symbols 3 and 4) in time domain and a subcarrier (occupy a subcarrier 1, a subcarrier 6, and a subcarrier 11) in frequency domain. Reference signals corresponding to the reference signal ports 0 and 1 are multiplexed on each group of time frequency resources (CDM-2 in TD) by using a corresponding orthogonal code. Reference signals corresponding to the reference signal ports 2 and 3 occupy three groups of time frequency resources (for example, a pattern 802). Each group of time frequency resources similarly occupy two contiguous symbols (symbols 3 and 4) in time domain and a subcarrier (occupy a subcarrier 0, a subcarrier 5, and a subcarrier 10) in frequency domain. The reference signals corresponding to the reference signal ports 2 and 3 are similarly multiplexed on each group of time frequency resources (CDM-2 in TD) by using a corresponding orthogonal code.

Specifically, the base station may generate and send the arrangement indication used to indicate that the reference signal is arranged based on the arrangement manner shown in FIG. 8, and for example, may determine an arrangement manner corresponding to a corresponding bit of 0 in DCI as the arrangement manner shown in FIG. 8, to indicate that the reference signal is arranged based on the arrangement manner shown in FIG. 8 in the high-frequency selection scenario, to obtain a performance gain by effectively using a property of flatness of the channel in time domain.

Figure 9:
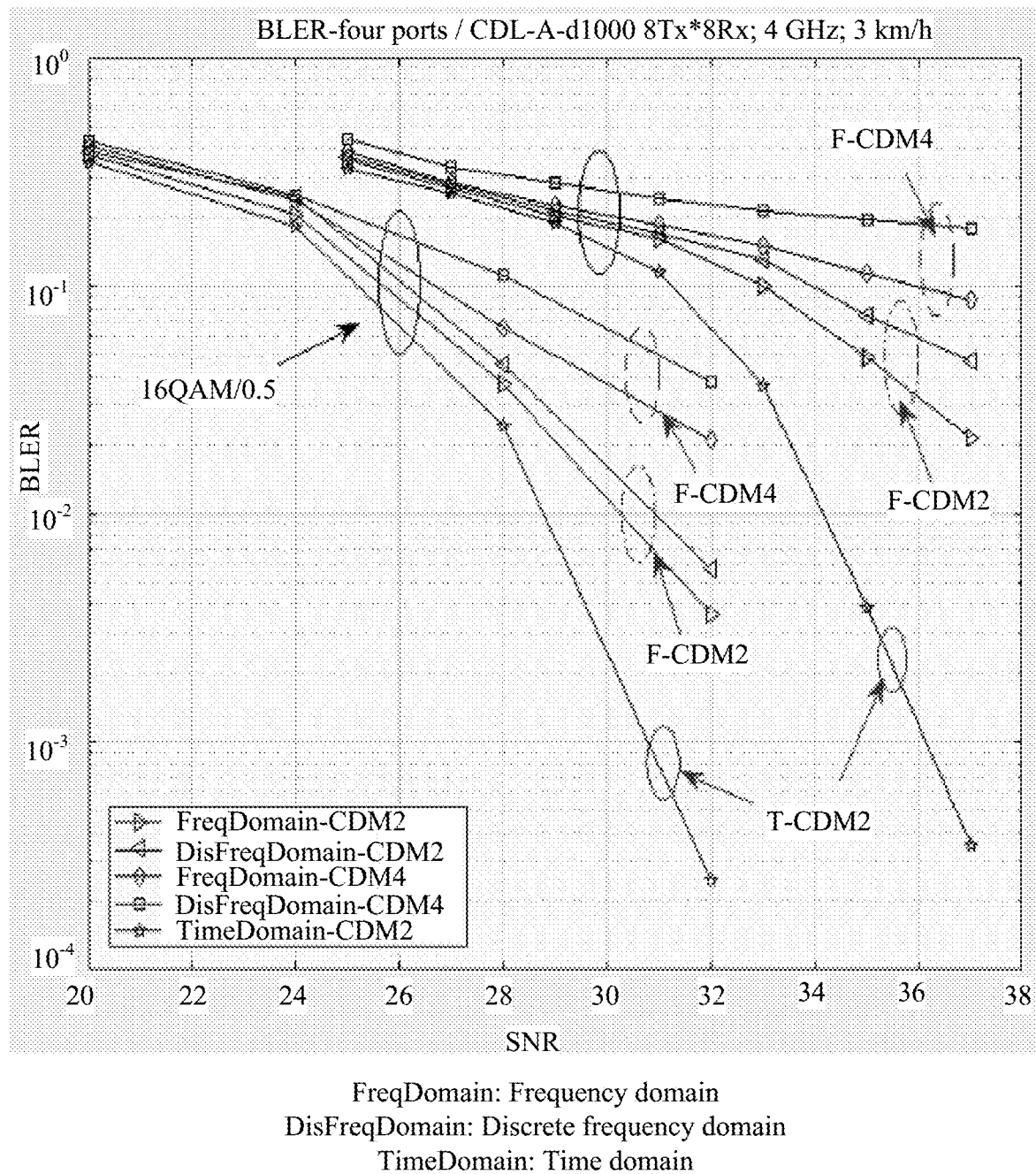
FIG. 9 is a schematic diagram of a performance gain corresponding to a solution according to some embodiments of the present invention.

For example, FIG. 9 is a schematic diagram of a performance gain corresponding to a solution according to some embodiments of the present invention. The schematic diagram shown in FIG. 9 shows value changes of a signal-to-noise ratio (SNR) and a block error rate (BLER) when the reference signals corresponding to the reference signal ports 0 and 1 and the reference signals corresponding to the reference signal ports 2 and 3 are arranged in a 16QAM modulation scheme in frequency division+code division manners F-CDM4 and F-CDM2 and a time division+code division manner T-CDM2. It can be learned that, compared with another solution, the solution of arrangement by using T-CDM2 has a lowest block error rate and therefore has best performance.

Figure 10:
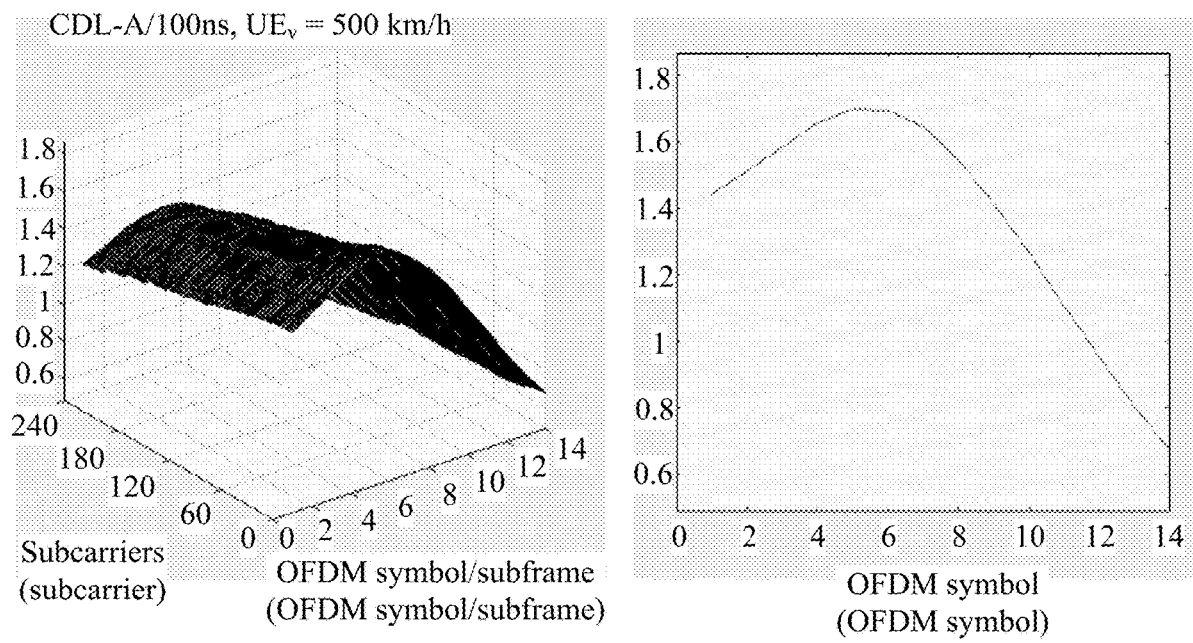
FIG. 10 is a schematic diagram of a channel property in a high-speed scenario according to some embodiments of the present invention.

Scenario 2: High-speed scenario:

FIG. 10 is a schematic diagram of a channel property in a high-speed scenario according to some embodiments of the present invention. As shown in FIG. 10, a characteristic of the scenario is that a channel drastically changes in time domain and slowly changes in frequency domain. Therefore, in some embodiments of the present invention, the base station may generate the arrangement indication used to indicate that the reference signal is arranged based on the frequency division or the frequency division+code division manner, and send the generated arrangement indication to the terminal, to obtain a performance gain by effectively using the property of flatness of the channel in frequency domain.

Figure 11:
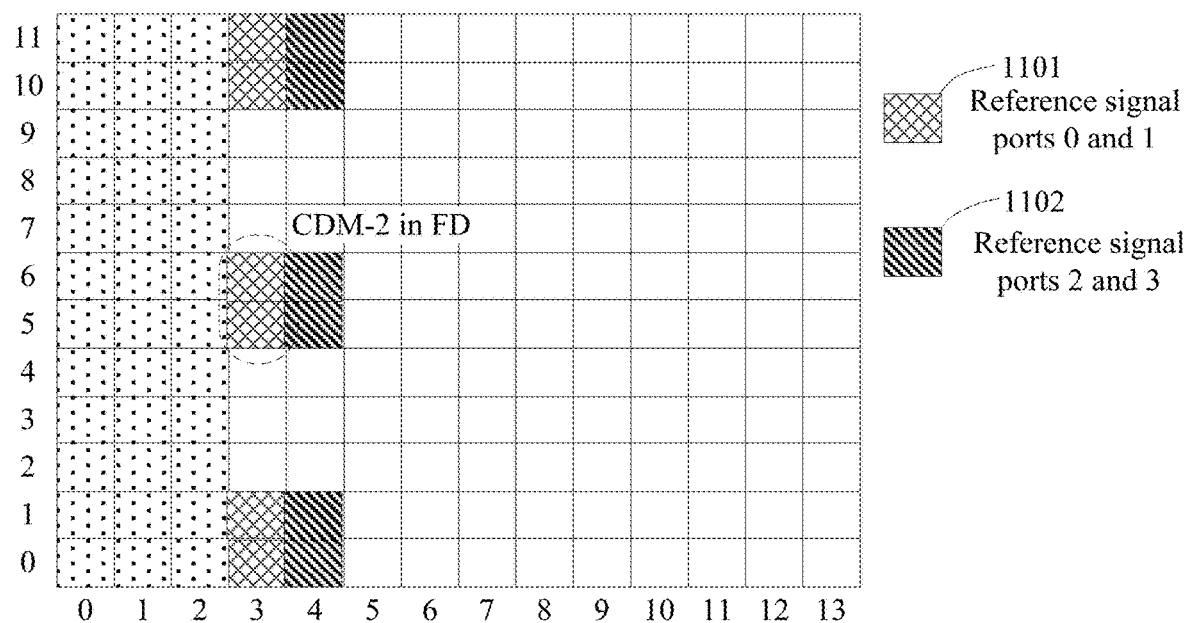
FIG. 11 is a schematic diagram of an arrangement manner of a reference signal in a high-speed scenario according to some embodiments of the present invention.

Specifically, FIG. 11 is a schematic diagram of an arrangement manner of a reference signal in a high-speed scenario according to some embodiments of the present invention.

As shown in FIG. 11, reference signal ports 0 and 1 and reference signal ports 2 and 3 are arranged on a time frequency resource based on the frequency division+code division manner (CDM-2 in FD (Frequency Domain) identified in the figure). Reference signals corresponding to the reference signal ports 0 and 1 occupy three groups of time frequency resources (for example, a pattern 1101). Each group of time frequency resources occupy two contiguous different subcarriers (occupy subcarriers 0 and 1, subcarriers 5 and 6, and subcarriers 10 and 11) in frequency domain and a symbol (symbol 3) in time domain. Reference signals corresponding to the reference signal ports 0 and 1 are multiplexed on each group of time frequency resources (CDM-2 in FD) by using a corresponding orthogonal code. Reference signals corresponding to the reference signal ports 2 and 3 occupy three groups of time frequency resources (for example, a pattern 1102). Each group of time frequency resources occupy two contiguous different subcarriers (occupy subcarriers 0 and 1, subcarriers 5 and 6, and subcarriers 10 and 11) in frequency domain and a symbol (symbol 4) in time domain. The reference signals corresponding to the reference signal ports 2 and 3 are similarly multiplexed on each group of time frequency resources (CDM-2 in FD) by using a corresponding orthogonal code.

Specifically, the base station may generate and send the arrangement indication used to indicate that the reference signal is arranged based on the arrangement manner shown in FIG. 11, and for example, may determine an arrangement manner corresponding to a corresponding bit of 1 in DCI as the arrangement manner shown in FIG. 11, to indicate that the reference signal is arranged based on the arrangement manner shown in FIG. 11 in the high-speed scenario, to avoid performance loss that may be caused by the similar example of the current arrangement solution shown in FIG. 1, and to obtain a performance gain by effectively using a property of flatness of the channel in frequency domain.

It can be learned that, in the solutions provided in the embodiments of the present invention, the base station can configure the reference signal by using few signaling indication resources, and configure the arrangement manner of the reference signal, so that the system can obtain higher channel estimation precision, and data demodulation is more accurate in a plurality of scenarios such as the high-speed scenario, the high-frequency scenario, and the high-frequency selection scenario. In addition, the system may differently arrange the reference signal in a fixed DMRS pattern, to reduce system complexity. Therefore, compared with a current arrangement solution of the reference signal, the solutions provided in the embodiments of the present invention can better satisfy a requirement that a future communications system (for example, 5G NR) needs to support a complex and fickle scenario, and can implement more reliable data transmission.

In conclusion, the embodiments of the present invention provide a solution by using which the arrangement manner of the reference signal can be flexibly configured, and are specifically used to flexibly configure a multiplexing manner of a reference signal port, so that the base station can dynamically and flexibly configure a multiplexing manner of a reference signal port based on a transmission requirement, and implement more reliable data transmission.

In the technical solutions provided in the embodiments of the present invention, a multiplexing manner and port mapping (equivalent to the arrangement manner) of the reference signal are re-designed, and related signaling modification is introduced. The base station configures signaling (equivalent to the arrangement indication), to freely configure a port multiplexing manner in different scenarios and implement more reliable data transmission. In addition, the base station configures signaling, so that multiplexing manner switching between ports is further supported (for example, switching between the time division+code division manner and the frequency division+code division multiplexing manner by using one bit in signaling is supported). A port multiplexing manner between target reference signal ports may be dynamically switched in a same RS pattern. Indication signaling may be sent by using RRC, DCI, or MAC. Therefore, flexible arrangement of a reference signal port can be implemented in the pilot pattern, a disadvantage of a current RS mapping and configuration solution characterized by a fixed mapping manner and a single function is overcome, and more reliable data transmission can be implemented.

Figure 12:
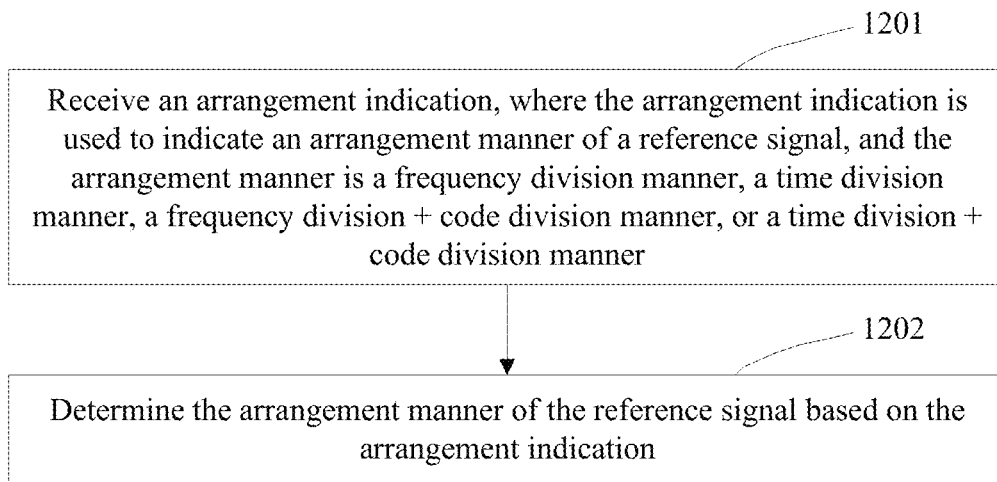
FIG. 12 is a schematic flowchart of an indication method according to some other embodiments of the present invention.

Based on a same technical idea, FIG. 12 is a flowchart of an indication method according to some embodiments of the present invention. A procedure shown in FIG. 12 may be implemented by a terminal. For example, the terminal shown in FIG. 2 may be configured with a physical or functional module configured to perform the procedure shown in FIG. 12 in, and the functional module configured to perform the procedure may be implemented by hardware, software programming, or a combination of software and hardware.

As shown in FIG. 12, the procedure includes the following steps.

Step 1201: Receive an arrangement indication, where the arrangement indication is used to indicate an arrangement manner of a reference signal.

Step 1202: Determine the arrangement manner of the reference signal based on the arrangement indication.

The reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

Corresponding to the method embodiment on a base station side described above in this application, in some embodiments of the present invention, if the arrangement manner of the reference signal is the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In some embodiments of the present invention, if the arrangement manner of the reference signal is the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In some embodiments of the present invention, if the arrangement manner of the reference signal is the frequency division manner or the frequency division+code division manner, different groups of time frequency resources occupy a same quantity of subcarriers in frequency domain.

In some embodiments of the present invention, if the arrangement manner of the reference signal is the time division manner or the time division+code division manner, different groups of time frequency resources occupy a same quantity of symbols in time domain.

In some embodiments of the present invention, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

Because a same technical idea is used as a basis, a specific implementation process of the indication method on the terminal side provided in the foregoing embodiments of the present invention may be adaptively adjusted based on the procedure of the indication method described on the base station side in the present invention. A specific implementation may be obtained based on the method embodiment on the base station side described in the foregoing embodiments of the present invention. Details are not described herein again in this application.

Based on a same invention idea, this application further provides an indication apparatus. Functional modules of the apparatus may be specifically implemented by hardware, software, or a combination of software and hardware. The apparatus may be deployed in a base station. For example, the apparatus may be deployed in the base station in the communications system shown in FIG. 2.

Figure 13:
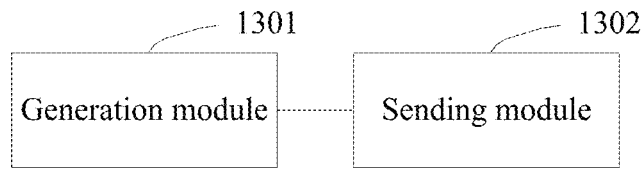
FIG. 13 is a schematic structural diagram of an indication apparatus according to some embodiments of the present invention.

FIG. 13 is a schematic structural diagram of an indication apparatus according to some embodiments of the present invention.

As shown in FIG. 13, the apparatus includes:

a generation module 1301, configured to generate an arrangement indication, where the arrangement indication is used to indicate an arrangement manner of a reference signal, the reference signal occupies at least one group of time frequency resources, and the arrangement manner is a frequency division manner, a time division manner, a frequency division+code division manner, or a time division+code division manner; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain; in the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and in the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal; and a sending module 1302, configured to send the arrangement indication.

In some embodiments of the present invention, in the frequency division manner, at least two groups of time frequency resources of the at least one group of time frequency resources occupy a same symbol in time domain, and subcarriers in frequency domain that are occupied by the at least two groups of time frequency resources do not overlap.

In some embodiments of the present invention, in the time division manner, at least two groups of time frequency resources of the at least one group of time frequency resources occupy a same subcarrier in frequency domain, and symbols in time domain that are occupied by the at least two groups of time frequency resources do not overlap.

In some embodiments of the present invention, in the frequency division manner, different groups of time frequency resources occupy a same quantity of subcarriers in frequency domain.

In some embodiments of the present invention, in the time division manner, different groups of time frequency resources occupy a same quantity of symbols in time domain.

In some embodiments of the present invention, a quantity of subcarriers in frequency domain that are occupied by any group of time frequency resources in the frequency division manner is equal to a quantity of symbols in time domain that are occupied by any group of time frequency resources in the time division manner.

Specifically, because principles for resolving a problem by the indication apparatus provided in this embodiment of the present invention is similar to that in the method embodiment provided in the foregoing embodiment of the present invention, for a specific implementation of the indication apparatus provided in this embodiment of the present invention and an implementation of the method provided in the foregoing embodiment of the present invention, refer to each other, and repeated parts are not described in detail again.

Based on a same invention idea, this application further provides an indication apparatus. Functional modules of the apparatus may be specifically implemented by hardware, software, or a combination of software and hardware. The apparatus may be deployed in a terminal. For example, the apparatus may be deployed in the terminal in the communications system shown in FIG. 2.

Figure 14:
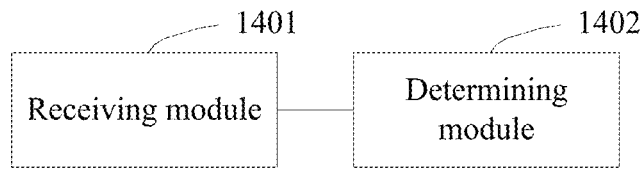
FIG. 14 is a schematic structural diagram of an indication apparatus according to some other embodiments of the present invention.

FIG. 14 is a schematic structural diagram of an indication apparatus according to some embodiments of the present invention. As shown in FIG. 14, the apparatus includes:

a receiving module 1401, configured to receive an arrangement indication, where the arrangement indication is used to indicate an arrangement manner of a reference signal; and a determining module 1402, configured to determine the arrangement manner of the reference signal based on the arrangement indication, where the reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

In some embodiments of the present invention, when the arrangement manner of the reference signal is the frequency division manner or the frequency division+code division manner, at least two groups of time frequency resources of the at least one group of time frequency resources occupy a same symbol in time domain, and subcarriers in frequency domain that are occupied by the at least two groups of time frequency resources do not overlap.

In some embodiments of the present invention, when the arrangement manner of the reference signal is the time division manner or the time division+code division manner, at least two groups of time frequency resources of the at least one group of time frequency resources occupy a same subcarrier in frequency domain, and symbols in time domain that are occupied by the at least two groups of time frequency resources do not overlap.

In some embodiments of the present invention, when the arrangement manner of the reference signal is the frequency division manner or the frequency division+code division manner, different groups of time frequency resources occupy a same quantity of subcarriers in frequency domain.

In some embodiments of the present invention, when the arrangement manner of the reference signal is the time division manner or the time division+code division manner, different groups of time frequency resources occupy a same quantity of symbols in time domain.

In some embodiments of the present invention, a quantity of subcarriers in frequency domain that are occupied by any group of time frequency resources in the frequency division manner or the frequency division+code division manner is equal to a quantity of symbols in time domain that are occupied by any group of time frequency resources in the time division manner or the time division+code division manner.

Specifically, because principles for resolving a problem by the apparatus deployed on a terminal side provided in this embodiment of the present invention is similar to that in the method embodiment on a terminal side provided in the foregoing embodiment of the present invention, for a specific implementation of the apparatus provided in this embodiment of the present invention and an implementation of the method on the terminal side provided in the foregoing embodiment of the present invention, refer to each other, and repeated parts are not described in detail again.

In this embodiment of this application, the module division is an example, and is merely logical function division and may be other division in actual implementation. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 15:
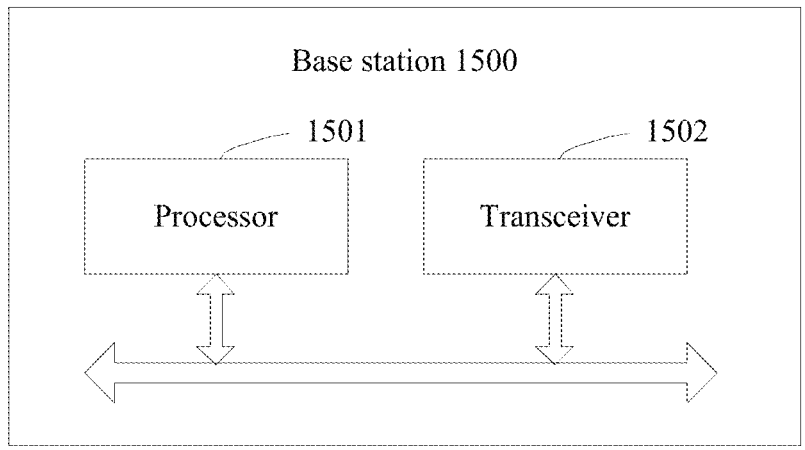
FIG. 15 is a schematic structural diagram of a base station according to some embodiments of the present invention.

Based on a same invention idea, this application further provides a base station. FIG. 15 is a schematic structural diagram of a base station according to some embodiments of the present invention.

As shown in FIG. 15, the base station 1500 may include a processor 1501. The processor 1501 may be a central processing unit (central processing unit, CPU), a digital processing module, or the like. The base station 1500 may further include a transceiver 1502. The processor 1501 is configured to generate an arrangement indication; and the transceiver 1502 is configured to send the arrangement indication.

The arrangement indication is used to indicate an arrangement manner of a reference signal, the reference signal occupies at least one group of time frequency resources, and the arrangement manner is a frequency division manner, a time division manner, a frequency division+code division manner, or a time division+code division manner; in the frequency division manner, each group of time frequency resources occupy a symbol in time domain and at least one contiguous subcarrier in frequency domain; in the time division manner, each group of time frequency resources occupy at least one contiguous symbol in time domain and a subcarrier in frequency domain; in the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and in the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

Specifically, the processor 1501 and the transceiver 1502 may be configured to perform the method provided in the foregoing embodiment of the present invention. Because principles for resolving a problem by the base station provided in this embodiment of the present invention is similar to that in the method embodiment provided in the foregoing embodiment of the present invention, for a specific implementation of the base station provided in this embodiment of the present invention and an implementation of the method provided in the foregoing embodiment of the present invention, refer to each other, and details are not described herein again in this application.

Although not shown in the figure, the base station 1500 may further include a memory, configured to store a program executed by the processor 1501. The memory may be a nonvolatile memory, for example, a hard disk (hard disk drive, HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto.

A specific connection medium between the processor 1501 and the transceiver 1502 is not limited in this embodiment of this application. In this embodiment of this application, in FIG. 15, the processor 1501 is connected to the memory 1502 by using a bus. The bus is indicated by using a hollow line with a double-headed arrow in FIG. 15, but it does not indicate that there is only one bus or one type of bus. A connection manner of other components is merely described by using an example, and is not limited thereto. The bus may be classified into an address bus, a data bus, a control bus, and the like.

An embodiment of the present invention further provides a readable storage medium, configured to store a software instruction required in execution by the foregoing processor, and including a program that needs to be executed for execution by the processor.

Figure 16:
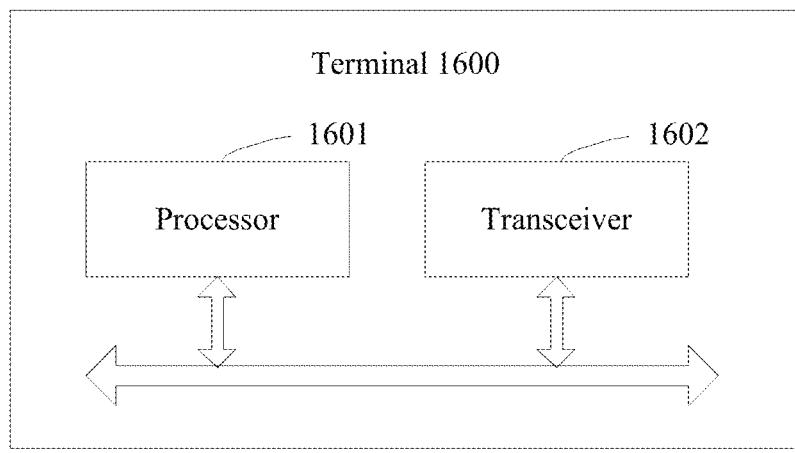
FIG. 16 is a schematic structural diagram of a terminal according to some embodiments of the present invention.

Based on a same invention idea, this application further provides a terminal. FIG. 16 is a schematic structural diagram of a terminal according to some embodiments of the present invention.

As shown in FIG. 16, the terminal 1600 may include a processor 1601. The processor 1601 may be a central processing unit, a digital processing module, or the like. The terminal 1600 may further include a transceiver 1602.

The transceiver 1602 is configured to receive an arrangement indication, where the arrangement indication is used to indicate an arrangement manner of a reference signal; and the processor 1601 is configured to determine the arrangement manner of the reference signal based on the arrangement indication, where the reference signal occupies at least one group of time frequency resources, and the arrangement manner is a frequency division manner, a time division manner, a frequency division+code division manner, or a time division+code division manner; if the arrangement manner of the reference signal is the frequency division manner, each group of time frequency resources occupy a symbol in time domain and at least one contiguous subcarrier in frequency domain; if the arrangement manner of the reference signal is the time division manner, each group of time frequency resources occupy at least one contiguous symbol in time domain and a subcarrier in frequency domain; if the arrangement manner of the reference signal is the frequency division+code division manner, each group of time frequency resources occupy a symbol in time domain and at least one contiguous subcarrier in frequency domain, and the reference signal is multiplexed on the group of time frequency resources by using an orthogonal code corresponding to the reference signal; and if the arrangement manner of the reference signal is the time division+code division manner, each group of time frequency resources occupy at least one contiguous symbol in time domain and a subcarrier in frequency domain, and the reference signal is multiplexed on the group of time frequency resources by using an orthogonal code corresponding to the reference signal.

Specifically, the processor 1601 and the transceiver 1602 may be configured to perform the method on a terminal side provided in the foregoing embodiment of the present invention. Because principles for resolving a problem by the terminal provided in this embodiment of the present invention is similar to that in the method embodiment provided in the foregoing embodiment of the present invention, for a specific implementation of the terminal provided in this embodiment of the present invention and an implementation of the method provided in the foregoing embodiment of the present invention, refer to each other, and details are not described herein again in this application.

Although not shown in the figure, the terminal 1600 may further include a memory, configured to store a program executed by the processor 1601. The memory may be a nonvolatile memory, for example, a hard disk or a solid-state drive, or may be a volatile memory, for example, a random access memory. The memory is any other medium that can carry or store expected program code in a form of an instruction or a data structure and that can be accessed by a computer, but is not limited thereto.

A specific connection medium between the processor 1601 and the transceiver 1602 is not limited in this embodiment of this application. In this embodiment of this application, in FIG. 16, the processor 1601 is connected to the transceiver 1602 by using a bus. The bus is indicated by using a hollow line with a double-headed arrow in FIG. 16, but it does not indicate that there is only one bus or one type of bus. A connection manner of other components is merely described by using an example, and is not limited thereto. The bus may be classified into an address bus, a data bus, a control bus, and the like.

An embodiment of the present invention further provides a readable storage medium, configured to store a software instruction required in execution by the foregoing processor, and including a program that needs to be executed for execution by the processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specified function in one or more processes in the flowcharts and/or in one or more blocks in the block diagrams.

These computer program instructions may be alternatively stored in a computer readable memory that can instruct a computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art can make various modifications and variations to this application without departing from the scope of this application. This application is intended to cover these modifications and variations of this application provided that they fall within the scope of the claims of this application and equivalent technologies thereof

What is claimed is:

1. An indication method, comprising:
generating an arrangement indication, wherein the arrangement indication indicates an arrangement manner of a reference signal, the reference signal occupies at least one group of time frequency resources, and the arrangement manner is one of a frequency division plus code division manner, and a time division plus code division manner; and wherein in the frequency division plus code division manner, each group of time frequency resources occupy a symbol in the time domain and at least one contiguous subcarrier in the frequency domain, and the reference signal is multiplexed on the group of time frequency resources using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap; and
sending the arrangement indication.

2. The method according to claim 1, wherein in the time division plus code division manner, at least two groups of time frequency resources of the at least one group of time frequency resources occupy a same subcarrier in the frequency domain, and symbols in the time domain that are occupied by the at least two groups of time frequency resources do not overlap.

3. The method according to claim 1, wherein in the frequency division plus code division manner, different groups of time frequency resources occupy a same quantity of subcarriers in the frequency domain.

4. The method according to claim 1, wherein in the time division plus code division manner, different groups of time frequency resources occupy a same quantity of symbols in the time domain.

5. The method according to claim 1, wherein a quantity of subcarriers in the frequency domain that are occupied by any group of time frequency resources in the frequency division plus code division manner is equal to a quantity of symbols in the time domain that are occupied by any group of time frequency resources in the time division plus code division manner.

6. An indication method, comprising:
receiving an arrangement indication, wherein the arrangement indication is used to indicate an arrangement manner of a reference signal; and
determining the arrangement manner of the reference signal based on the arrangement indication, wherein the reference signal occupies at least one group of time frequency resources, and the arrangement manner is one of frequency division plus code division manner, and a time division plus code division manner; and wherein in the frequency division plus code division manner, each group of time frequency resources occupy a symbol in the time domain and at least one contiguous subcarrier in the frequency domain, and the reference signal is multiplexed on the group of time frequency resources using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap.

7. The method according to claim 6, wherein in the frequency division plus code division manner, different groups of time frequency resources occupy a same quantity of subcarriers in the frequency domain.

8. The method according to claim 6, wherein in the time division plus code division manner, different groups of time frequency resources occupy a same quantity of symbols in the time domain.

9. An indication apparatus, wherein the apparatus is deployed in a base station, and the apparatus comprises:

a processor; and a non-transitory computer readable medium storing instructions, that when executed by the processor perform steps comprising:

generating an arrangement indication, wherein the arrangement indication is used to indicate an arrangement manner of a reference signal, the reference signal occupies at least one group of time frequency resources, and the arrangement manner is one of a frequency division plus code division manner, and a time division plus code division manner; and wherein in the frequency division plus code division manner, each group of time frequency resources occupy a symbol in the time domain and at least one contiguous subcarrier in the frequency domain, and the reference signal is multiplexed on the group of time frequency resources by using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap; and sending, configured to send the arrangement indication.

10. The apparatus according to claim 9, wherein in the time division plus code division manner, at least two groups of time frequency resources of the at least one group of time frequency resources occupy a same subcarrier in the frequency domain, and symbols in the time domain that are occupied by the at least two groups of time frequency resources do not overlap.

11. The apparatus according to claim 9, wherein in the frequency division plus code division manner, different groups of time frequency resources occupy a same quantity of subcarriers in the frequency domain.

12. The apparatus according to claim 9, wherein in the time division plus code division manner, different groups of time frequency resources occupy a same quantity of symbols in the time domain.

13. The apparatus according to claim 9, wherein a quantity of subcarriers in the frequency domain that are occupied by any group of time frequency resources in the frequency division plus code division manner is equal to a quantity of symbols in the time domain that are occupied by any group of time frequency resources in the time division plus code division manner.

14. An indication apparatus, wherein the apparatus is deployed in a terminal and comprises:

a processor; and a non-transitory computer readable medium storing instructions, that when executed by the processor perform steps comprising:

receiving an arrangement indication, wherein the arrangement indication is used to indicate an arrangement manner of a reference signal; and determining the arrangement manner of the reference signal based on the arrangement indication, wherein the reference signal occupies at least one group of time frequency resources, and the arrangement manner is one of a frequency division plus code division manner, and a time division plus code division manner; in the frequency division plus code division manner, each group of time frequency resources occupy a symbol in the time domain and at least one contiguous subcarrier in the frequency domain, and the reference signal is multiplexed on the group of time frequency resources using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap.

15. The apparatus according to claim 14, wherein in the time division plus code division manner, at least two groups of time frequency resources of the at least one group of time frequency resources occupy a same subcarrier in the frequency domain, and symbols in the time domain that are occupied by the at least two groups of time frequency resources do not overlap.

16. The apparatus according to claim 14, wherein in the frequency division plus code division manner, different groups of time frequency resources occupy a same quantity of subcarriers in the frequency domain.

17. The apparatus according to claim 14, wherein in the time division plus code division manner, different groups of time frequency resources occupy a same quantity of symbols in the time domain.

18. The apparatus according to claim 14, wherein a quantity of subcarriers in the frequency domain that are occupied by any group of time frequency resources in the frequency division plus code division manner is equal to a quantity of symbols in the time domain that are occupied by any group of time frequency resources in the time division manner or the time division plus code division manner.

19. A non-transitory computer-readable storage medium storing computer instructions, that when executed by one or more processors, cause the one or more processors to perform the steps of:

generating an arrangement indication, wherein the arrangement indication indicates an arrangement manner of a reference signal, the reference signal occupies at least one group of time frequency resources, and the arrangement manner is one of a frequency division plus code division manner, and a time division plus code division manner; and wherein in the frequency division plus code division manner, each group of time frequency resources occupy a symbol in the time domain and at least one contiguous subcarrier in the frequency domain, and the reference signal is multiplexed on the group of time frequency resources using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap; and sending the arrangement indication.

20. The medium according to claim 19, wherein in the frequency division plus code division manner, different groups of time frequency resources occupy a same quantity of subcarriers in the frequency domain.

21. The medium according to claim 19, wherein in the time division plus code division manner, different groups of time frequency resources occupy a same quantity of symbols in the time domain.

22. A non-transitory computer-readable storage medium storing computer instructions, that when executed by one or more processors, cause the one or more processors to perform the steps of:

receiving an arrangement indication, wherein the arrangement indication is used to indicate an arrangement manner of a reference signal; and determining the arrangement manner of the reference signal based on the arrangement indication, wherein the reference signal occupies at least one group of time frequency resources, and the arrangement manner is one of a frequency division plus code division manner, and a time division plus code division manner; and wherein in the frequency division plus code division manner, each group of time frequency resources occupy a symbol in the time domain and at least one contiguous subcarrier in the frequency domain, and the reference signal is multiplexed on the group of time frequency resources using an orthogonal code corresponding to the reference signal; and in the time division plus code division manner, each group of time frequency resources occupy at least one contiguous symbol in the time domain and a subcarrier in the frequency domain, and the reference signal is multiplexed on the group of time frequency resources using an orthogonal code corresponding to the reference signal, wherein in the frequency division plus code division manner, at least two groups of time frequency resources of the at least one group of time frequency resources occupy a same symbol in the time domain, and subcarriers in the frequency domain that are occupied by the at least two groups of time frequency resources do not overlap.

23. The medium according to claim 22, wherein in the frequency division plus code division manner, different groups of time frequency resources occupy a same quantity of subcarriers in the frequency domain.

24. The medium according to claim 22, wherein in the time division plus code division manner, different groups of time frequency resources occupy a same quantity of symbols in the time domain.

* * * * *